US006698021B1

(12) United States Patent
Amini et al.

(10) Patent No.: US 6,698,021 B1
(45) Date of Patent: Feb. 24, 2004

(54) SYSTEM AND METHOD FOR REMOTE CONTROL OF SURVEILLANCE DEVICES

(75) Inventors: Shaun S. Amini, Ashburn, VA (US); Gary Backlund, Potomac Falls, VA (US)

(73) Assignee: Vigilos, Inc., Seattle, WA (US)

( * ) Notice: Subject to any disclaimer, the term of this patent is extended or adjusted under 35 U.S.C. 154(b) by 0 days.

(21) Appl. No.: 09/417,162

(22) Filed: Oct. 12, 1999

(51) Int. Cl.[7] ............................................. H04N 7/173
(52) U.S. Cl. ...................... 725/105; 709/203; 709/205; 348/15; 348/211; 348/143; 348/151
(58) Field of Search .......................... 348/15, 211, 143, 348/151, 153; 345/1; 725/105; 709/203, 218, 219, 244, 245, 247, 249; 382/104

(56) References Cited

U.S. PATENT DOCUMENTS

| | | | |
|---|---|---|---|
| 5,467,402 A | * 11/1995 | Okuyama ................... 382/104 |
| 5,600,368 A | 2/1997 | Matthews, III | |
| 5,729,471 A | 3/1998 | Jain et al. | |
| 5,838,368 A | * 11/1998 | Masunaga ................... 348/211 |
| 5,903,455 A | 5/1999 | Sharpe, Jr. et al. | |
| 6,075,553 A | * 6/2000 | Freeman ...................... 348/15 |
| 6,128,298 A | * 10/2000 | Wooton et al. ............. 370/392 |
| 6,185,601 B1 | * 2/2001 | Wolff .......................... 709/203 |
| 6,243,129 B1 | * 6/2001 | Deierling .................... 348/15 |
| 6,271,805 B1 | * 8/2001 | Yozenawa ................... 345/1 |
| 6,356,949 B1 | 3/2002 | Katsandres et al. | |

FOREIGN PATENT DOCUMENTS

| | | |
|---|---|---|
| EP | A 0804031 | 10/1997 |
| WO | WO A 9707486 | 2/1997 |

* cited by examiner

*Primary Examiner*—Andy Rao
*Assistant Examiner*—Charles E Parsons
(74) *Attorney, Agent, or Firm*—Christensen O'Connor Johnson Kindness PLLC

(57) ABSTRACT

A system and method for enabling real-time off-site video image storage is disclosed. An off-site storage site is coupled to camera servers at client sites via a private network. Each camera server is further coupled to one or more surveillance cameras. Video images captured by cameras located at the client sites are forwarded to an off-site server via a camera server. Video images received by the off-site server are produced for live viewing and/or archived in an image database. Users can retrieve live or archived video images through a client workstation that communicates with the off-site server over the public Internet. Retrieval of video images is based on a web-browser interface. Live viewing of video images is supplemented by real-time camera control functions that alter the pan-tilt-zoom (PTZ) position of the camera producing the live images. Commands for controlling the PTZ camera are encoded by the client workstation and transmitted to the off-site server. The off-site server converts the camera control codes into control strings that are recognizable by the particular camera.

53 Claims, 16 Drawing Sheets

SYSTEM AND METHOD FOR REMOTE CONTROL OF SURVEILLANCE DEVICES

BACKGROUND

1. Field of the Invention

The present invention relates to video surveillance and monitoring systems, and more particularly, to video surveillance and monitoring systems that stores video image data in an off-site storage site.

2. Discussion of the Related Art

Surveillance and monitoring systems have played a valuable role in many contexts. For example, surveillance video cameras are well renowned for capturing images of criminals that have burglarized various financial and commercial institutions. Video cameras have also played an increasingly valuable role in less visible contexts. For example, video cameras are increasingly being used to monitor work environments to ensure productivity or compliance with operating procedures. Additionally, video cameras are also valuable in providing evidence that establishes the non-occurrence of events in insurance fraud cases.

Video surveillance and monitoring systems will continue to proliferate as new applications of the video technology are identified. Limitations of conventional video surveillance and monitoring systems, however, greatly reduce the ultimate effectiveness of the technology.

FIG. 1 illustrates a conventional video surveillance and monitoring environment 100. Video surveillance and monitoring environment 100 includes a client site 110 and a viewing site 120. Client site 110 is a self-contained operation that governs the capture and storage of analog video image data. In a typical installation, client site 110 consists of a video camera 114 coupled to a video cassette recorder (VCR) 112. Analog video data captured by video camera 114 is stored onto a videotape 130 that has been inserted into a VCR 112.

As one can readily appreciate, conventional surveillance and monitoring environment 100 is subject to severe limitations. First, client site 110 is a highly insecure environment. Access to the sole copy of the captured image data is limited only by the relative security procedures that control the access to the location where videotapes 130 are stored. For example, in a criminal context, a perpetrator need only access the location in client site 110 that houses VCR 112. Once accessed, videotape 130 can be located and ultimately removed from the premises, thereby removing the sole piece of evidence.

Even assuming that videotape 130 has not been removed from client site 110, the video surveillance operation is severely limited. The ultimate goal of the surveillance process is to provide images to a particular party that is responsible or interested in the events occurring at client site 110. That individual is often located in a remote location relative to client site 110. If that remote location, illustrated as viewing site 120, is separated by a significant geographical distance, then videotape 130 needs to be shipped through insecure channels (e.g., express mail) to the interested party. Even if the videotape 130 is hand-delivered, videotape 130 may not reach the hands of the interested party residing in viewing site 120 for up to 3 days. This substantial delay is often unacceptable in situations that require a swift or timely response by the responsible organization.

In addition to the security and responsiveness issues described above, video surveillance and monitoring environment 100 also suffers from inherent technical limitations. Videotape image storage is limited by the physical capacity of videotape 130. This limited capacity creates numerous problems in situations that require continual surveillance.

Human factors are therefore necessary to cope with the physical limitations of surveillance and monitoring environment 100. The entry of human factors creates another set of operational problems. VCRs 112 may not be reloaded. Recorded videotapes 130 can also be misplaced, mislabeled, or cataloged in error. These errors are particularly problematic because the archival nature of video surveillance and monitoring environment 100 would be severely impacted.

Advances in computer technology have augmented the functionality of conventional video surveillance systems. In particular, analog video image systems have been replaced by digital video image systems. An example of this updated video surveillance and monitoring environment is illustrated in FIG. 2.

Video surveillance and monitoring environment 206 includes client site 210 and viewing site 220. In a typical installation, client site 210 consists of a video camera 214 coupled to a server computer 212. Video images captured by video camera 214 are stored on an electronic storage medium (e.g., hard drive, tape drive, etc.) coupled to server computer 212. Video images stored on server computer 212 are accessible by user workstation 222 at viewing site 220 via a direct dial-up connection.

The ability to retrieve images via a direct dial-up connection significantly improves the timeliness of delivery of image data to an interested party. However, video surveillance and monitoring environment 200 is still subject to significant limitations. In particular, the functionality at client site 210 is impacted by significant maintenance issues.

First, the ongoing system maintenance of customized and proprietary software resident on server computer 212 impacts overall system availability. This is particularly problematic when considering the multiplicative effect introduced by a client's needs at multiple client sites 210. Each individual server computer 212 would require a separate software upgrade whenever a software patch or new version becomes available. In a similar manner, software resident on each user workstation 222 may also require frequent software updates.

Maintenance issues are also relevant to the actual system operation of server computer 212. Although the capacity of electronic storage devices (not shown) coupled to server computer 212 is much larger relative to the storage capacity of videotapes 130, a technician must routinely get involved in the coordination of the overall video image archive. For example, the technician must monitor the relative fullness of the storage device that is in active use to ensure that memory is not being overrun. Further, a technician must ensure that removable storage devices are not misplaced, mislabeled, or cataloged in error.

In general, the existence of a physical library of removable storage devices leads to a highly insecure environment. In a similar fashion to video surveillance and monitoring environment 100, access to the sole copy of the archived video image data is limited only by the relative security that controls the physical access to the library of removable storage devices. The removal of a removable storage device from client site 210 is an inherent fault of video surveillance and monitoring environment 200.

The security issues surrounding dial-up access to stored video image data is also significant. Remote users operating at client workstation 222 are typically given access to data stored at client site 210 based upon a simple check of a user ID and corresponding password. This level of access security is minimal and, in many cases, is entirely inappropriate for maintaining sufficient privacy of stored video image data.

More generally, access to video image data stored at client site 210 is also limited by the communications capacity of server computer 212. In many instances, server computer 212 is configured with only a single communication port (not shown). This single communication port limits the remote access to only a single user at a time. In these cases, multiple, simultaneous remote user access would not be possible, thereby limiting the overall utility of video surveillance and monitoring environment 200. It should also be noted that access to server computer 212 via a dial-up connection would also be subject to any applicable long distance or ISDN charges.

As thus described, video surveillance and monitoring environments 100, 200 each have significant limitations that affect one or more characteristics of system reliability, system security, and system performance. What is needed therefore is a video surveillance and monitoring environment that addresses each of these concerns while providing virtually unlimited and instantaneous remote access to video image data.

SUMMARY OF THE INVENTION

The present invention provides a framework for real-time off-site video image storage that enables increased functionality in the retrieval of video images. An off-site storage site is coupled to camera servers at client sites via a private network. Each camera server is further coupled to one or more surveillance cameras.

Video images captured by cameras located at the client sites are forwarded to an off-site server via a camera server. Video images received by the off-site server are produced for live viewing and/or archived in an image database.

Users can retrieve live or archived video images through a client workstation that communicates with the off-site server over the public Internet. Retrieval of video images is based on a web-browser interface. Archived video images can be viewed through VCR-type controls that control the playback of cached video images. Live viewing of video images is supplemented by real-time camera control functions that alter the pan-tilt-zoom (PTZ) position of the camera producing the live images. Commands for controlling the PTZ camera are encoded by the client workstation and transmitted to the off-site server. The off-site server, operating as a proxy between the client workstations and the camera servers, converts the camera control codes into binary-coded camera control command strings that are recognizable by the particular camera.

BRIEF DESCRIPTION OF THE DRAWINGS

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the invention is discussed in detail below. While specific implementations are discussed, it should be understood that this is done for illustration purposes only. A person skilled in the relevant art will recognize that other components and configurations may be used without parting from the spirit and scope of the invention.

Video surveillance and monitoring systems are being applied in an increasing variety of contexts, ranging from traditional security applications (e.g., financial institutions) to commercial applications (e.g., manufacturing, power plant, etc.). In many cases, the needs of a single corporate entity extend beyond a localized surveillance and monitoring system within a single site. Corporate entities can contract for a surveillance and monitoring solution to be applied across multiple sites that are located not only throughout the United States but also throughout one or more foreign countries.

From any corporate entity's standpoint, a practical video surveillance and monitoring solution should provide functionality that easily scales across a rapidly changing corporate landscape. Critical issues for these corporate entities include concerns over the security, ease of access, convenience, and maintainability of the system.

Figure 1:
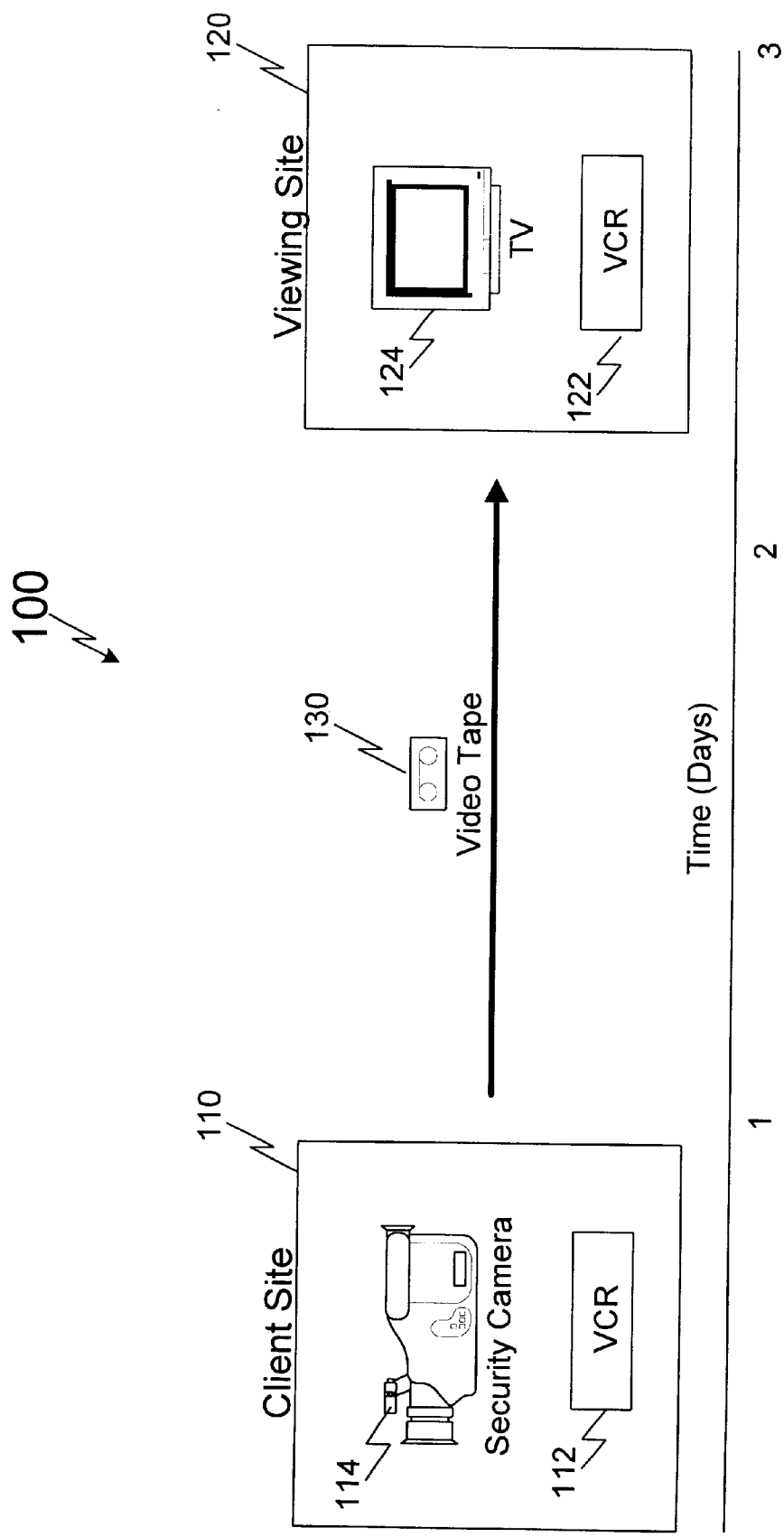
FIG. 1 illustrates an analog video surveillance and monitoring environment.
Figure 2:
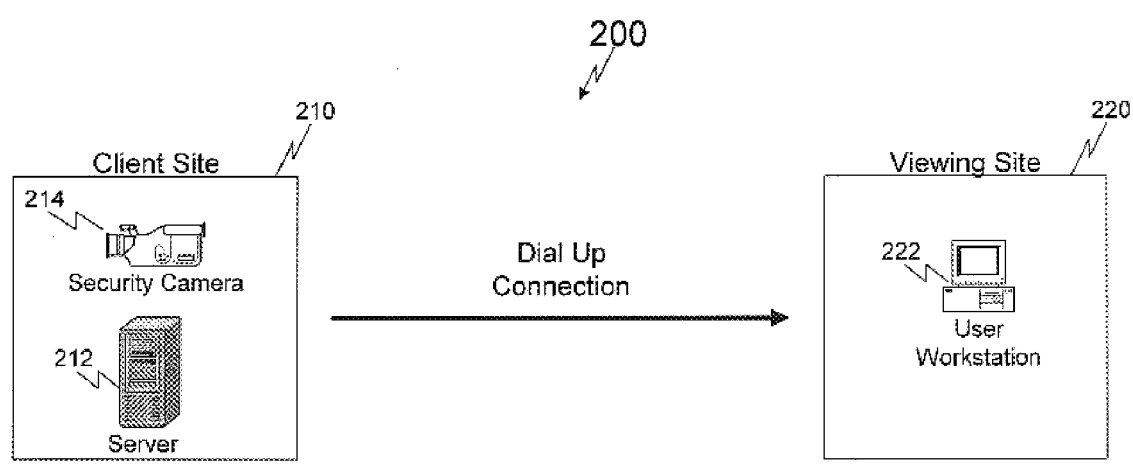
FIG. 2 illustrates a digital video surveillance and monitoring environment that is accessed via a dial-up connection.
Figure 3:
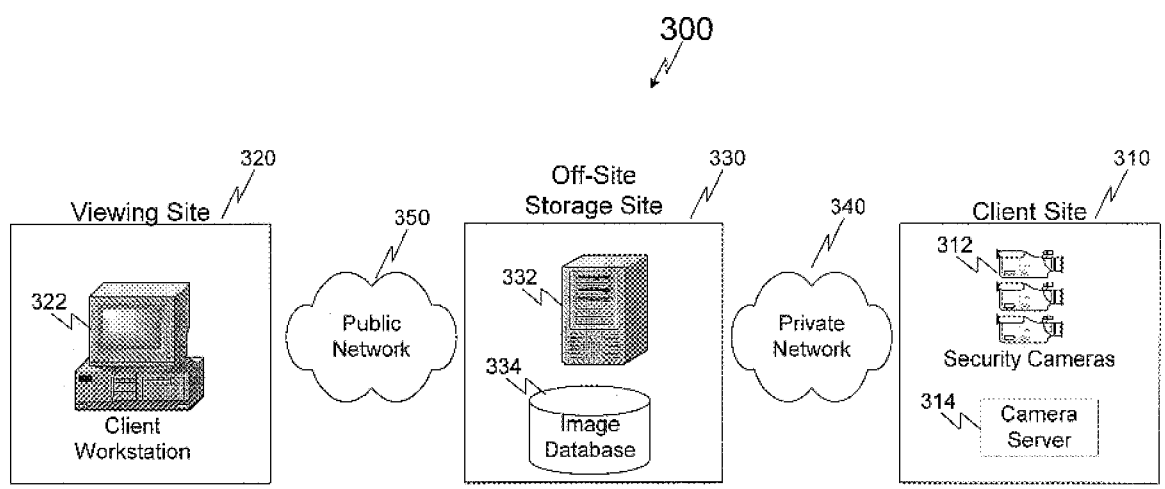
FIG. 3 illustrates a digital video surveillance and monitoring environment that stores video image data at an off-site storage location.

FIG. 3 illustrates a high-level overview of a video surveillance and monitoring environment 300 of the present invention that addresses the above-mentioned needs in a scalable fashion. Video surveillance and monitoring environment 300 includes a client site 310, a viewing site 320, and an off-site storage site 330. Client site 310 includes one or more security cameras 312 that acquire video image data for transmission to off-site storage site 330 via a private network 340.

In one embodiment, private network 340 is a private backbone network that may be controlled by the service provider that controls the operation of off-site storage site 330. In another embodiment, private network 340 is a virtual private network that is operative over a public network 350 (e.g., the Internet).

Video image data that is transmitted to off-site storage site 330 is received by off-site server 332. Although off-site server 332 is illustrated in FIG. 3 as a single computer, it should be recognized that the functionality described below can be performed by one or more server computers. Video image data received by off-site server 332 can be archived within image database 334 for subsequent retrieval by client workstation 322 and/or made available to client workstation 322 for live viewing. As would be appreciated by one of ordinary skill in the relevant art, image database 334 can be implemented in a variety of alternative forms that facilitate the storage of large video image files. For example, image data can be stored in a proprietary "binary" format to contain xMB of images. Alternatively, image data can be stored in a file system using directory trees.

In a preferred embodiment, client workstation 322 views video image data using a web-browser enabled user interface. As will be described in detail below, client workstation 322 can also effect pan-tilt-zoom (PTZ) control of one or more security cameras 312 at client site 310 via communication with off-site server 332. In a preferred embodiment, communication between client workstation 322 and off-site server 332 is operative over public Internet 350.

Prior to discussing the operation of video surveillance and monitoring environment 300 in detail, several notable features enabled through the architecture of the present invention are examined.

A first feature of the present invention is the flexibility of one or more client workstations 322 in accessing video image data (live or archived) that is captured by one or more security cameras 312. This flexibility in access has two significant aspects. First, a single client workstation 322 can access, in rapid succession, video image data that is captured by a plurality of security cameras 312, a subset of which, may be located at separate client sites 310.

For example, consider a large corporate entity having ten client sites 310, wherein each client site 310 has nine security cameras 312. Assume that an individual located at a corporate headquarters (i.e., viewing site 320) desires to view video image data (live and/or archived) that is captured by site 3/camera 7, site 5/camera 2, and site 7/camera 9. The video image data generated by the three geographically distinct cameras 312 can be sequentially accessed, in rapid succession, through a single communication session with off-site server 332. Significantly, client workstation 322 is not required to sequentially establish an independent communication session with three on-site servers 212 located at distinct client sites 210. This speed of access is a key element in the provision of a centralized view of a corporate entity's operation.

A second aspect of the flexibility in access is related to the simultaneous viewing of video image data generated by a single security camera 312. In the present invention, multiple client workstations 322 located at separate viewing sites 320 can each independently communicate with off-site server 332 to obtain the video image data (live and/or archived) that is captured by a single security camera 312.

A second feature of the present invention is the improved security of the captured video image data. As noted, all of the captured video image data is transmitted in real-time to off-site storage site 330 via private network 340. The transmitted video image data is subsequently stored in image database 334, which serves as a general archive facility. This general archive facility is not exposed to activity at client site 310. Accordingly, archived video image data is not exposed to adverse conduct (e.g., stealing of an incriminating videotape or removable storage device) by individuals at client site 310.

A third feature of the present invention is the improved maintainability of the software that is operative in client workstation 322 and off-site server 332. All software updates can be centralized at off-site server 332. These updates can be effected at client workstation 322 through the transmission of web page data, including Java applet code, that can be used by a web browser in rendering the user interface and providing system functionality.

A fourth feature of the present invention is the improved levels of network security that can be implemented. Unlike conventional on-site systems that rely solely on user IDs and passwords, the present invention is capable of implementing multiple levels of access security. In particular, off-site storage site 330 can include one or more servers that serve as a repository of client certificates (e.g., X.509 certificates), wherein the service provider operates as its own certificate authority (CA). The client certificates enable client workstation 322 and off-site server 332 to authenticate each other and to negotiate cryptographic keys to be used in a secure socket layer (SSL) communication session. As part of the SSL communication session, off-site server 332 can further require a user ID and password. In this manner, increased confidentiality of video images obtained by the surveillance and monitoring operation can be provided. X.509 certificates and SSL communication are described in greater detail in W. Stallings, *Cryptography and Network Security: Principles and Practice*, Second Edition, 1999. Further features of the present invention will become apparent upon the more detailed description below.

Figure 4:
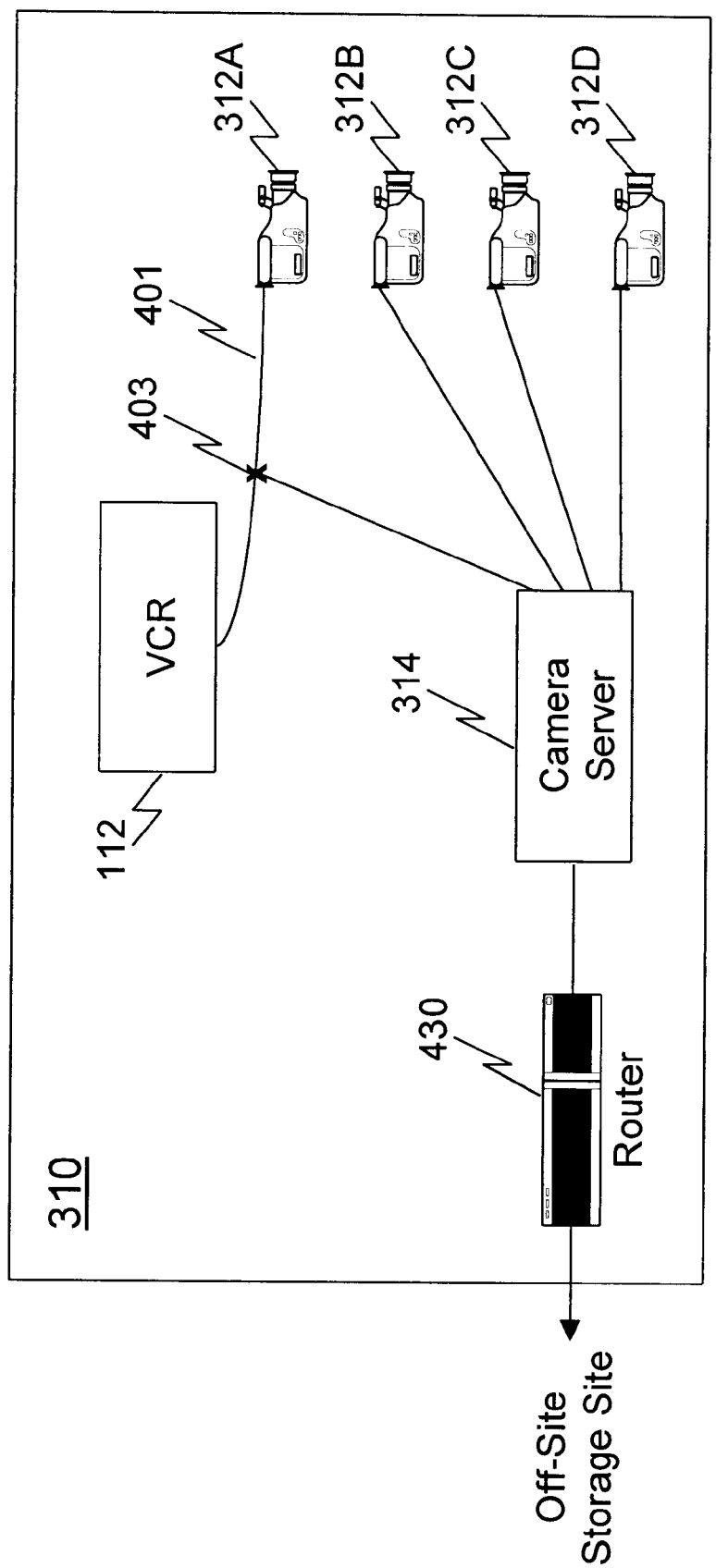
FIG. 4 illustrates the network and surveillance elements existing at a client site.

In describing the operation of video surveillance and monitoring environment 300, a detailed description of the components at client site 310 is first provided. FIG. 4 illustrates an example configuration of network and surveillance elements that can exist at client site 310. As shown, client site 310 includes four cameras 312A–312D, each dedicated to a particular view at client site 310, that are coupled to camera server 314. Camera server 314 communicates with off-site storage site 330 via router 430. It should be noted that the concepts of the present invention can be applied to a variety of camera types existing at client site 310, including cameras that produce composite NTSC video image data as well as self-contained web server and network cameras (e.g., AXIS 200+ Web Camera by AXIS Communications).

One of the advantages of the present invention is its ability to leverage an existing surveillance infrastructure that can exist at client site 310. For example, consider a conventional analog video surveillance system having a video camera 312A that produces composite NTSC video image data. In this conventional arrangement, captured video images are transmitted to VCR 112, via link 401, for storage onto a videotape 130. The present invention can be applied to this existing infrastructure by splitting the video signal existing on link 401 at junction 403. The video signal captured by camera 312A can then be transmitted to camera server 314. Upon receipt by camera server 314, the captured video signal can be converted into an appropriate format (e.g., JPEG, MPEG, etc.). As would be appreciated by one of ordinary skill in the relevant art, the concepts of the present invention are not dependent upon a particular video format.

Camera server 314 is generally operative to transmit captured video images to off-site server 332. To support this operation, camera server 314 preferably includes hardware/ software that enables video image compression, web-server functionality, and network communications. One example of camera server 314 is the AXIS 240 camera server manufactured by AXIS Communications.

As illustrated in FIG. 4, camera server 314 can be coupled to a plurality of cameras 312A–312D. In one embodiment, camera server 314 is coupled to cameras 312A–312D via a multiplexer (not shown). Camera server 314 can also be synchronized to network time servers under the authority of the National Institute of Standards and Technology (NIST). This synchronization enables camera server 314 to accurately record time of day information.

In a preferred embodiment, communication between camera server 314 and off-site server 332 is effected using the hypertext transfer protocol (HTTP). As further illustrated in FIG. 4, camera server 314 communicates with off-site server 332 using the appropriate routing facilities (illustrated at client site 310 as router 430).

Figure 5:
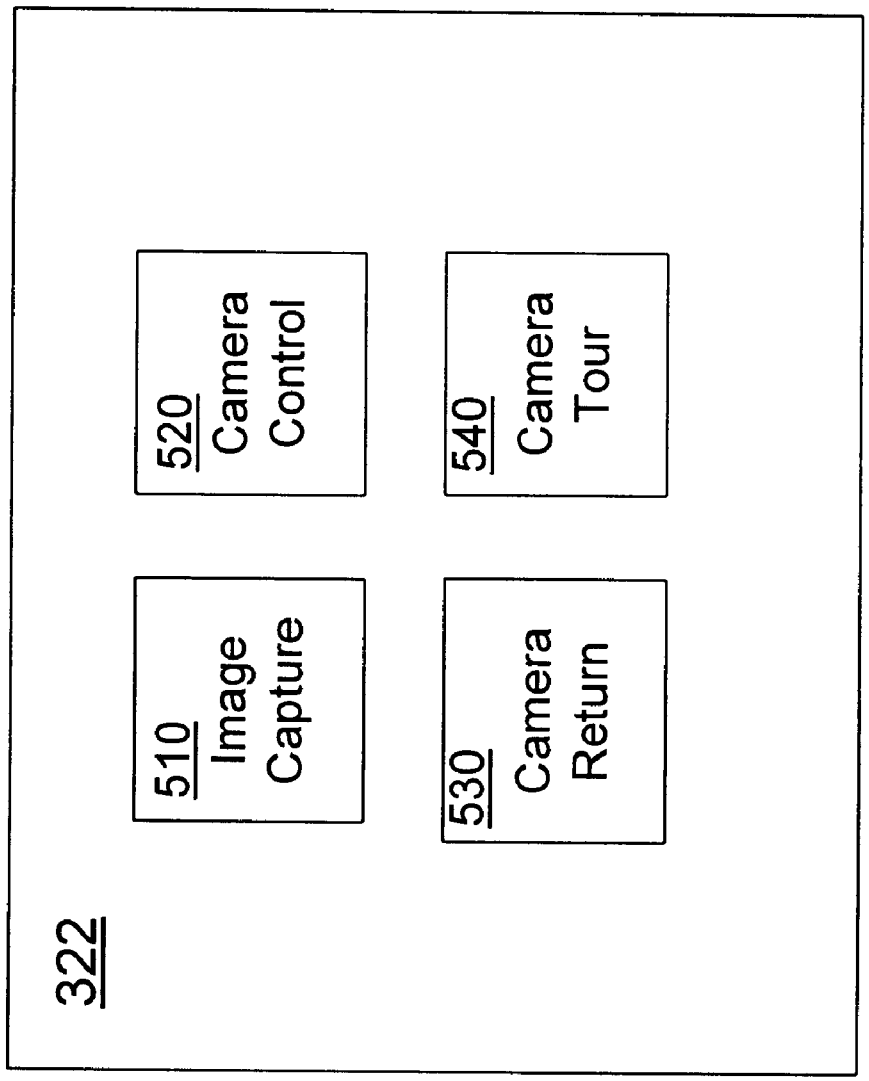
FIG. 5 illustrates the applications that reside on a server component at an off-site storage location.
Figure 6:
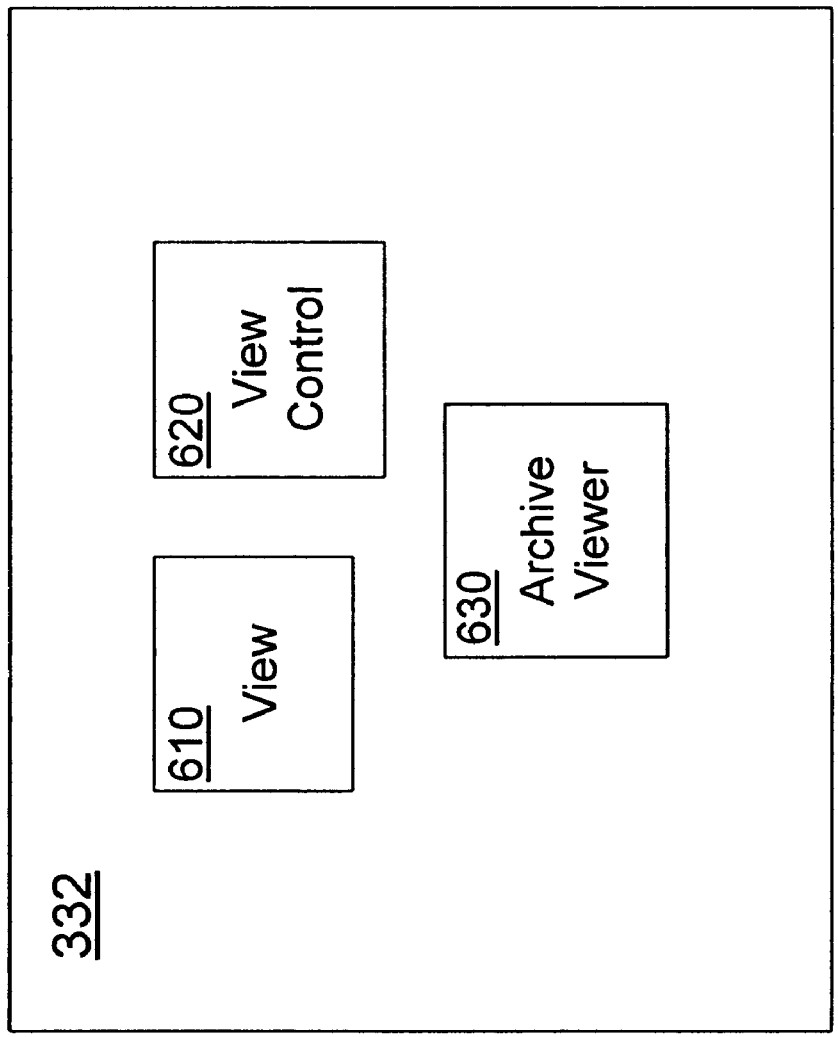
FIG. 6 illustrates the applications that reside on a client component.

Having described the hardware facilities existing in video surveillance and monitoring environment 300, a brief description of the software facilities is now provided. In particular, the application programs resident within the computing environments supported by off-site server 332 and client workstation 322 are illustrated in FIG. 5 and FIG. 6, respectively.

The computing environment supported by off-site server 332 includes ImageCapture application 510, CameraControl application 520, CameraReturn application 530, and CameraTour application 540. ImageCapture application 510 is a program responsible for collecting images from camera servers 314. As will be described in detail below, the collection of video image data can be event-driven based upon the events occurring at client site 310. After ImageCapture application 510 collects images from camera servers 314, ImageCapture application 510 can control the production of live video images and/or write the video image data to image database 334 for archive purposes. ImageCapture application 510 can also be configured with the additional capability of placing another image (i.e., logo) onto the original image in anticipation for public viewing.

ImageCapture application 510 is the application responsible for enabling individuals at client workstations 322 to view video images that are captured by any camera 312 that is coupled to the network. As described below, users at client workstations 322 can view live video images or retrieve archived video images that are stored in image database 334 at off-site storage site 330.

CameraControl application 520, CameraReturn application 530, and CameraTour application 540 can be embodied as Java servlet programs that are collectively involved in the PTZ control of the cameras 312 that are coupled to camera servers 314. More specifically, CameraControl application 520 is responsible for receiving camera control commands that are generated by ViewControl application 620. As illustrated in FIG. 6, ViewControl application 620 can be embodied as a Java applet program resident on client workstation 322. After interpreting the received camera control command codes from ViewControl application 620, CameraControl application 520 forwards a binary-coded camera control command string to the intended camera 312.

CameraReturn application 530 is responsible for returning a PTZ camera 312 to a specific preset after a given period of time. CameraReturn application 530 ensures that a PTZ camera 312 is always looking at something useful no matter where it was left by the last user. For example, consider a scenario where a user at client workstation 322 desires to view live images that are being captured by camera 312D at client site 310. Assume further that ImageCapture application 510 is configured for providing live images as well as storing archived images captured by camera 312D. If the user, through ViewControl application 620 at client workstation 322, inadvertently changes the position of camera 312D to an unusable position, then all of the captured video image data to be stored in image database 334 would be worthless until the camera 312 is returned to a usable viewing position. CameraReturn application 530 thereby ensures that a PTZ camera 312 is always capturing useful video image data. As part of this process, the administrator can designate an arbitrary number of minutes, the expiration of which will cause a command to be sent to return the PTZ camera 312 to a preset position.

CameraTour application 540 is capable of moving a PTZ camera 312 to a list of preset positions, allowing the PTZ camera 312 to pause at each preset position for a period of time specified by the end user.

Figure 10A:
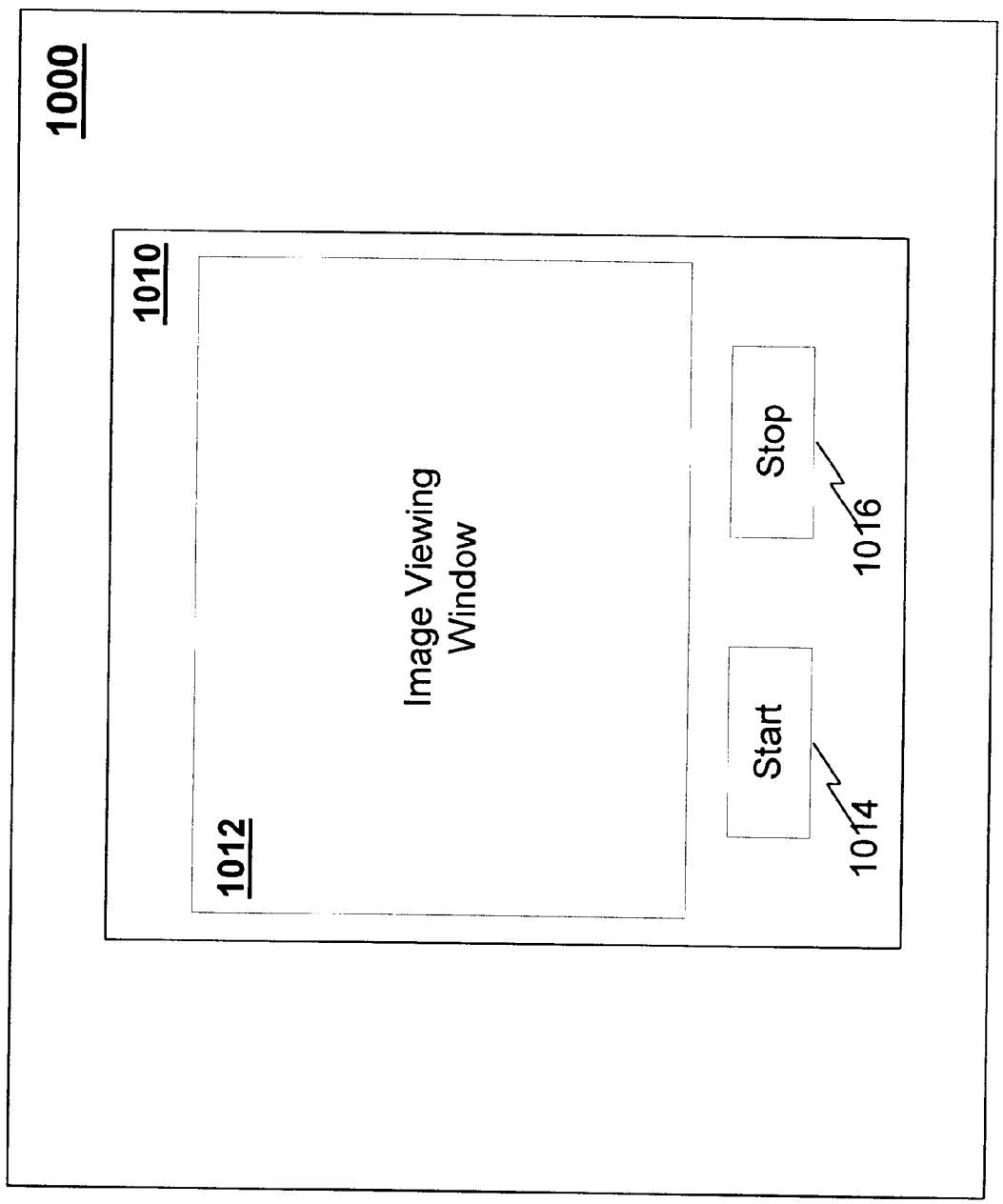
FIGS. 10A–10C illustrate an embodiment of a graphical user interface that enables the viewing and interactive control over live video image data.

Referring now to FIG. 6, the computing environment supported by client workstation 322 includes View application 610, ViewControl application 620, and ArchiveViewer application 630. View application 610 can be embodied as a Java applet program that controls the display of the current live image from a selected camera 312 in a window in a web-browser interface. As noted, the current live image is published by ImageCapture application 510 operating in the computing environment supported by off-site server 332. An example of this user interface is illustrated in FIG. 10A.

Figure 10B:
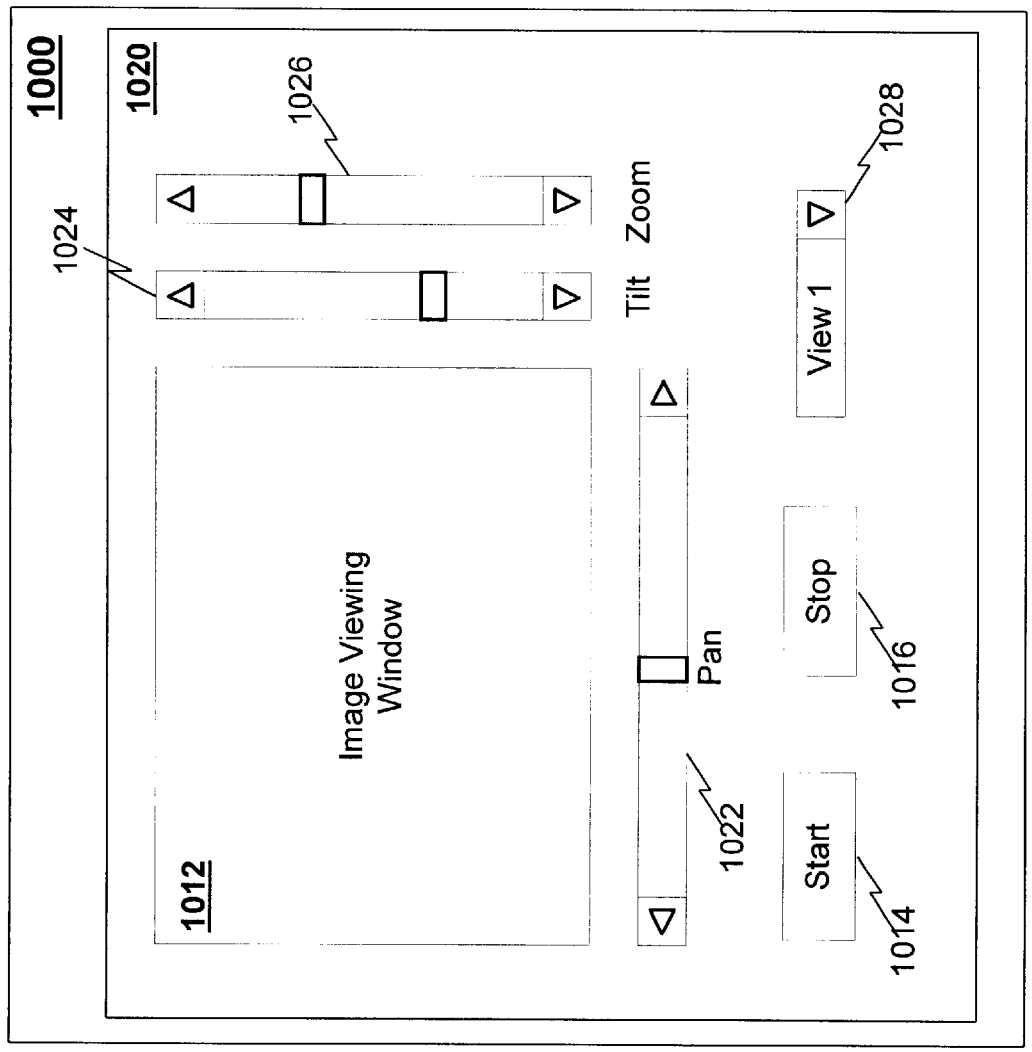
Figure 10C:
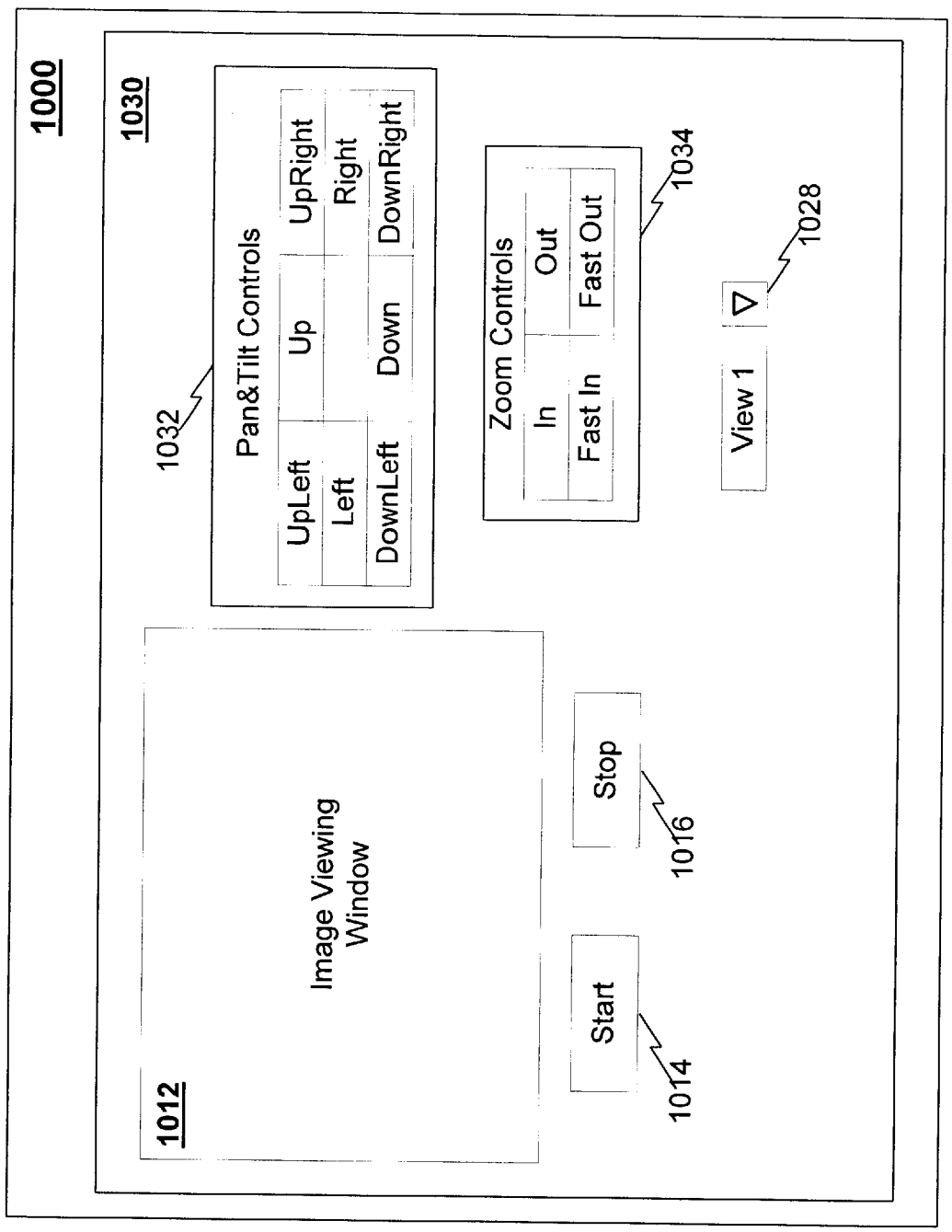

ViewControl application 620 can be embodied as a Java applet program that displays the current live image from a selected camera 312 and has controls for moving a PTZ-enabled camera 312. These control commands are sent out as codes to CameraControl application 520 operating at off-site server 322, which in turn contacts the PTZ-enabled camera 312 via camera server 314. Examples of this user interface are illustrated in FIGS. 10B and 10C.

Figure 9A:
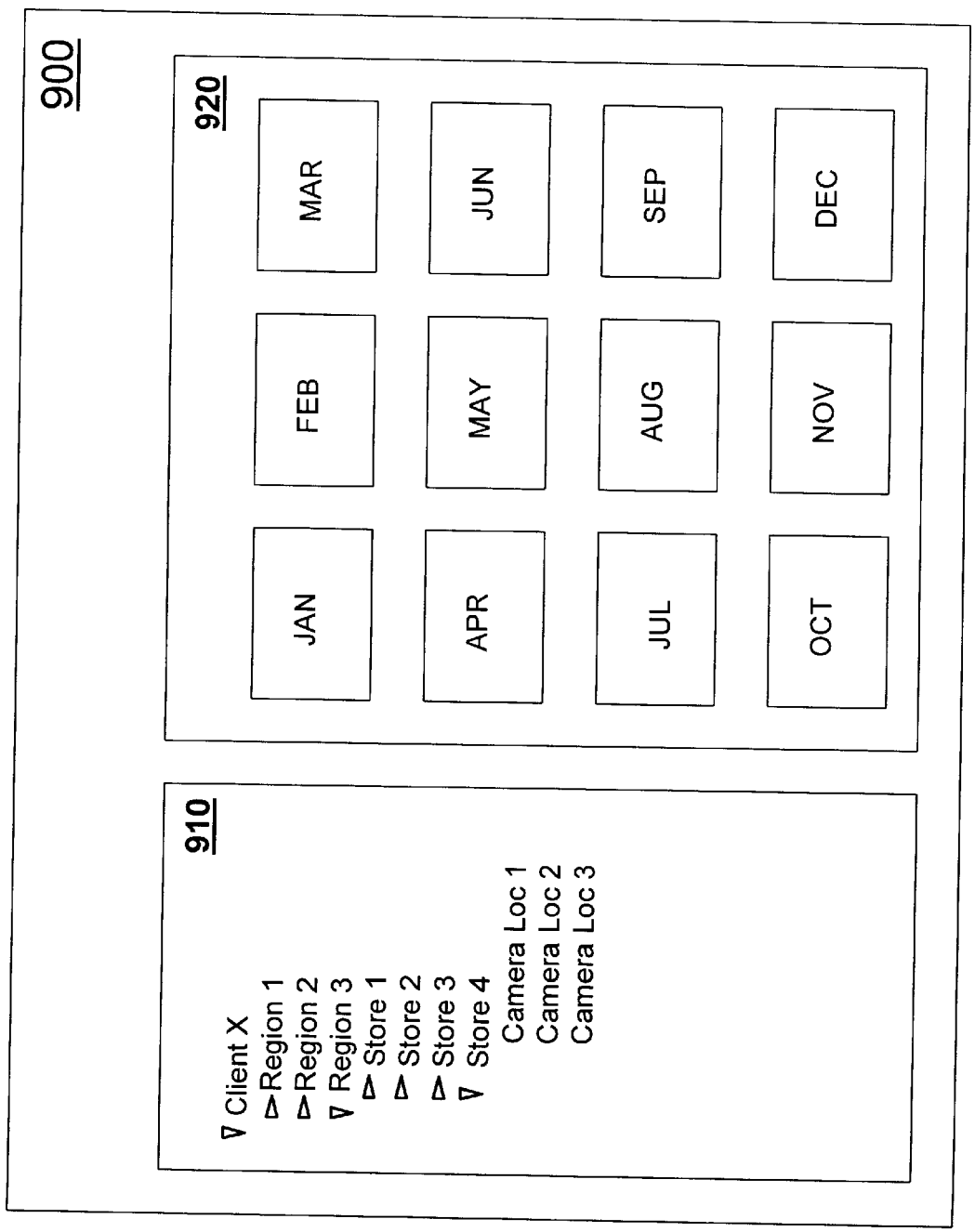
FIGS. 9A–9C illustrate an embodiment of a graphical user interface that enables the acquisition and display of archived video image data.
Figure 9B:
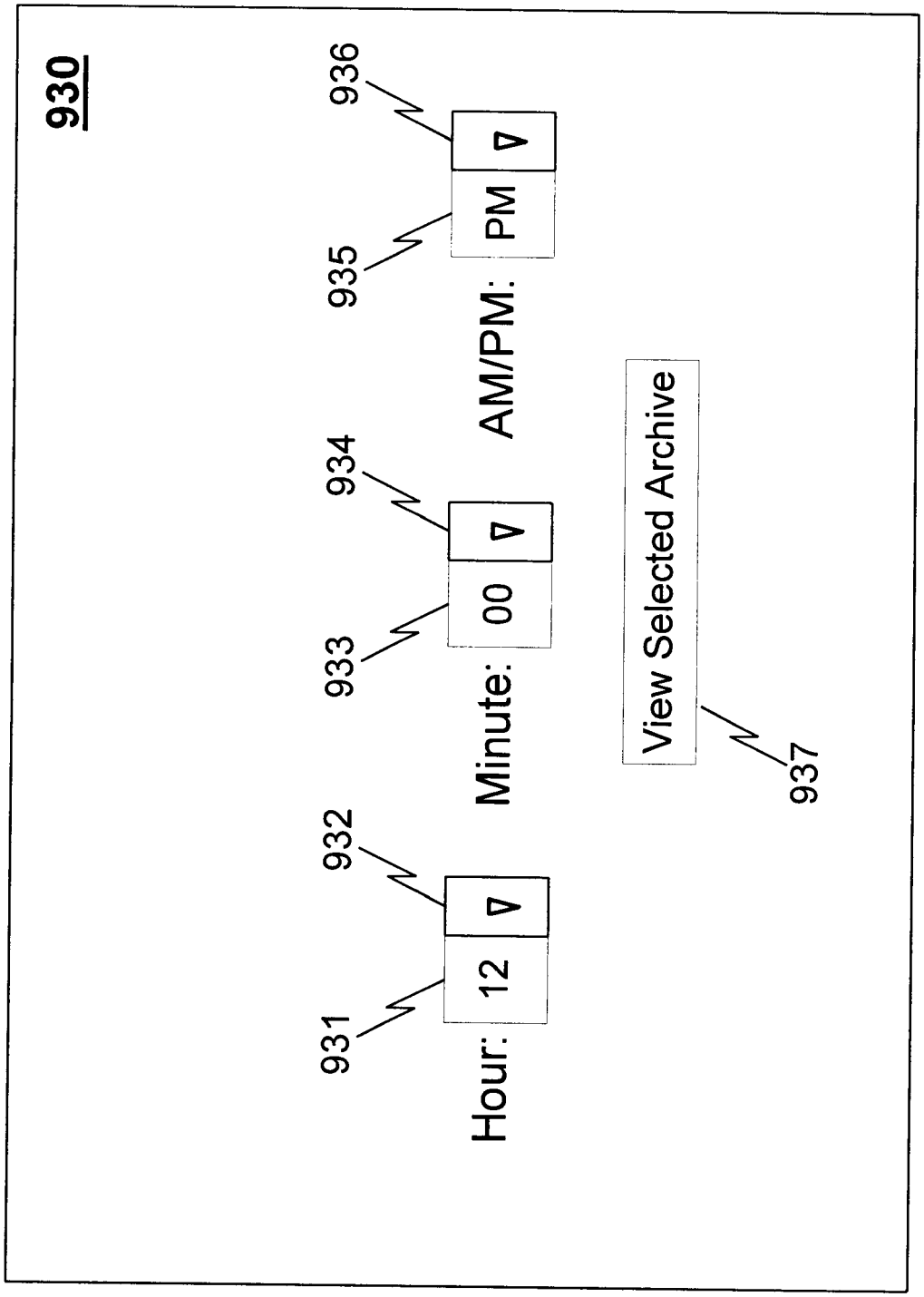
Figure 9C:
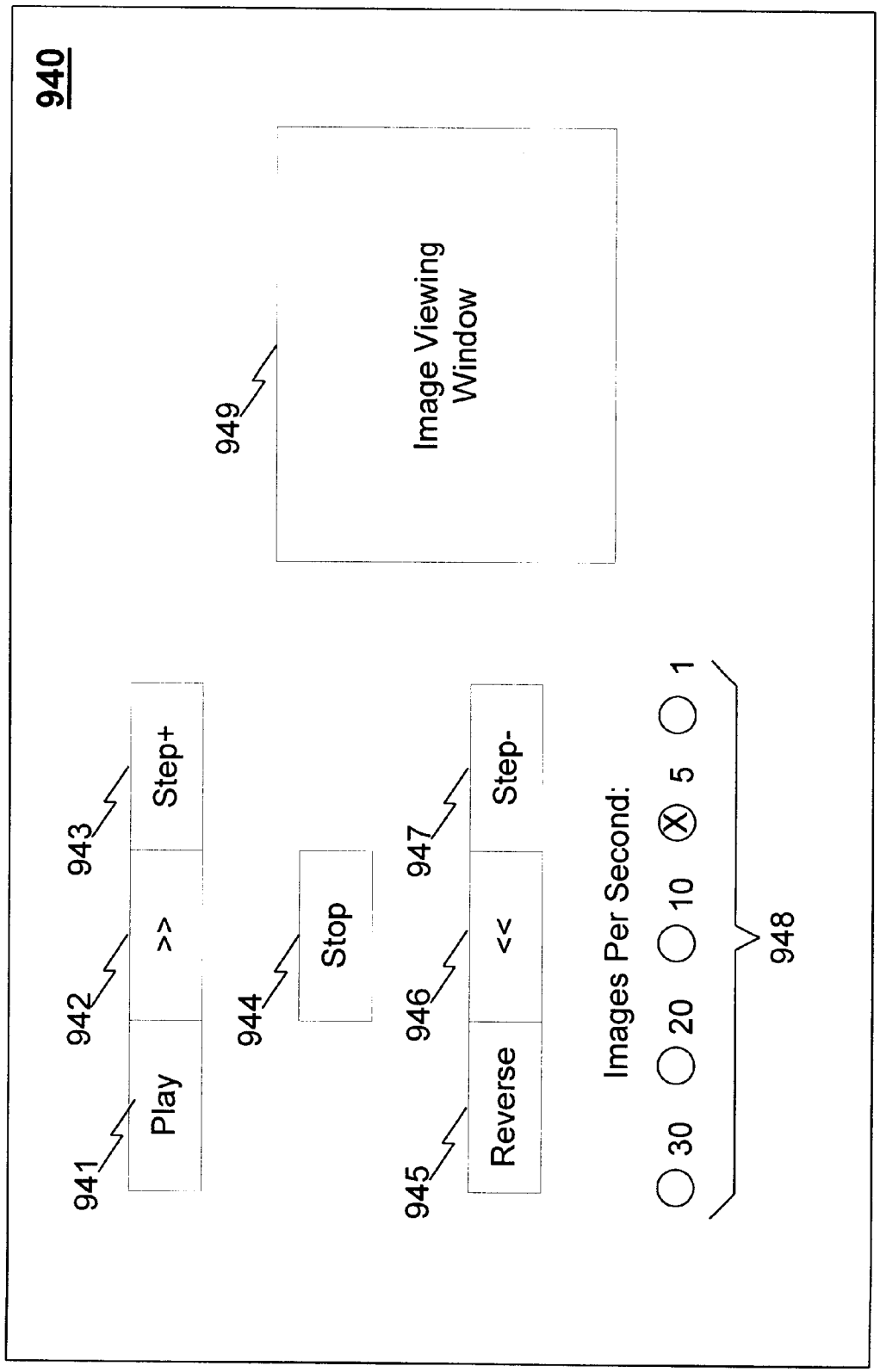

ArchiveViewer application 630 can be configured as a program, combining hypertext markup language (HTML), JavaScript, Java, etc., that determines what archived video image data a user at client workstation 322 desires to view. After the archived video image data is identified, ArchiveViewer application 630 caches a predetermined number of video images, then displays the video images for the user. ArchiveViewer application 630 includes a graphical user interface with VCR-type controls for altering the speed of playback (e.g., 30 images every second) in either direction. An example of this user interface is illustrated in FIGS. 9A–9C.

Having described the general software components in video surveillance and monitoring environment 300, a detailed description of the primary processing elements is now provided. At off-site server 332, ImageCapture application 510 controls the production of live video image data as well as the archive storage of video image data in image database 334.

The retrieval of captured image data from a particular camera 312 can be controlled by ImageCapture application 510 in a variety of ways. The control of this retrieval process is enabled by the definition of a configuration file for each camera 312. In one embodiment, the configuration file includes the following parameters: a recording type (live only/archive only/both), a database directory, an event processing selection (y/n), event processing options, a start/stop time, and a time-zone offset.

The recording type parameter informs ImageCapture application 510 whether captured video image data should only be published for live viewing, whether captured video image data should only be archived in image database 334, or whether captured video should be published for live viewing and be archived in image database 334. The database directory parameter identifies the database directory in which the captured video image data should be written for archive purposes. The event processing selection parameter informs ImageCapture application 510 whether the camera 312 associated with the configuration file is to be controlled in accordance with the occurrence of events at client site 310. Event processing is further defined by the event processing options parameters. The start/stop time parameter is used to configure ImageCapture application 510 such that video images are retrieved from the associated camera 312 during a specified period of time (e.g., office hours). Finally, time-zone offset parameter identifies the relative time offset of the time zone in which the associated camera 312 is located relative to the time-zone of off-site storage site 330. The time-zone offset parameter enables off-site server 332 to properly index video image data records that are stored in image database 334.

With the specified parameters in the configuration file, ImageCapture Application 510 can flexibly control the retrieval of video images from camera 312. In one method, a user specifies the relevant start/stop time parameters. As noted, the start/stop time parameters are used to define a period of time during which captured video images are forwarded to ImageCapture Application 510 by camera server 314. This scenario represents the most common form of surveillance and monitoring where a user can specify the retrieval of video image data during an establishment's hours of operation.

Alternatively, or in combination, with the above retrieval scenario, a user can also specify an event-driven recording scheme. In this scheme, the configuration file can be used to enable ImageCapture Application 510 to react to events that occur at client site 310. For example, camera server 314 can be configured to receive event data generated by various types of physical events, including such actions as a door opening, a cash register opening, motion detected in a camera's vicinity, the activation of a piece of machinery, etc. Hi-Low logic data representative of these types of physical events can be forwarded by camera server 314 to ImageCapture Application 510 to define various state transitions.

To facilitate this form of event-driven processing, the event processing selection parameter in the configuration file is set to an affirmative state (e.g., "Y"). This parameter value signals to ImageCapture Application 510 that event data received from camera server 314 should be processed in accordance with the event processing options parameters in the configuration file.

Figure 7:
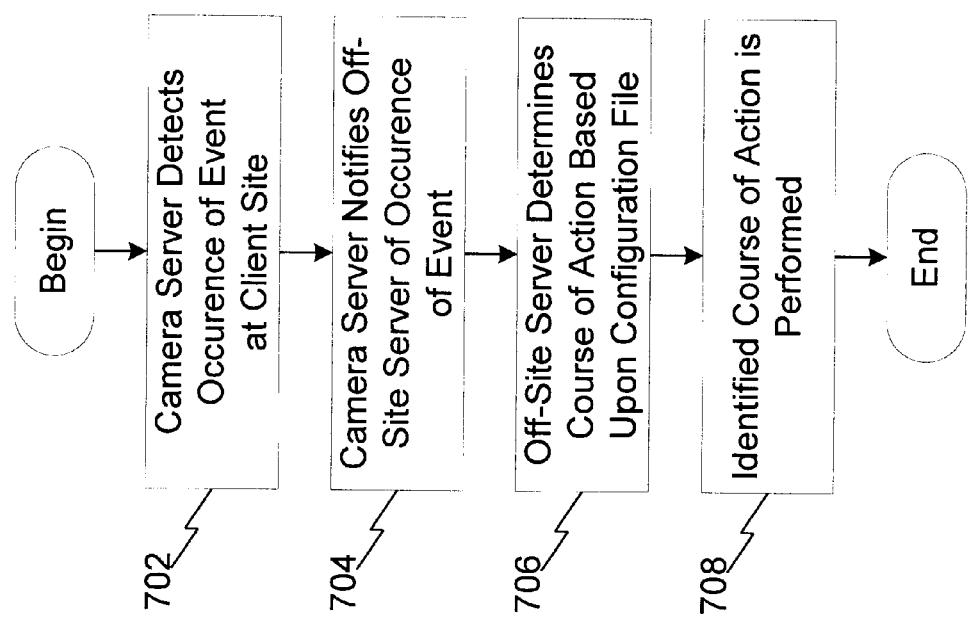
FIG. 7 is a flowchart of the processing steps of an event driven image acquisition process.

The general event driven processing scheme is illustrated by the flowchart in FIG. 7. In the process illustrated by FIG. 7, it is assumed that the event processing selection parameter in the configuration file is set to an affirmative state. The process begins at step 702 where camera server 314 detects the occurrence of an event (e.g., opening of a door) at client site 310. The detection of a change in state (e.g., low to high) of an event variable prompts camera server 314, at step 704, to notify ImageCapture Application 510 of the occurrence of the event.

Next, at step 706, ImageCapture Application 510 determines a course of action based upon the occurrence of the event. Determination of the course of action is based upon the event processing options parameters in the configuration file. Performance of the determined course of action occurs at step 708.

There are virtually an unlimited number of possible courses of action that could be followed upon the detection of an event. In a simple example, the occurrence of an event (e.g., opening of a door) prompts ImageCapture Application 510 to issue a request for video image data. This request for video image data can be specified in various ways. ImageCapture Application 510 can instruct camera server 314 to forward a certain amount of images, e.g., N video images, N seconds/minutes of video images, video images until the event stops, etc.

Other courses of action in response to the occurrence of an event can include the initiation of a notification process. In one example, the notification process includes a text message page to a predefined recipient(s) alerting the recipient(s) of the occurrence of the event. In another example, the notification process includes an email to a predefined recipient(s) alerting the recipient(s) of the occurrence of the event. The email notification can also include an attachment that comprises one or more video images.

An email notification having a collection of video images as an attachment is a particularly significant feature. Consider a scenario where a client has set up an event-driven process that is based upon the activation of an alarm generated by the opening of a door. An individual responsible for security at client site 310 can be notified immediately of the occurrence of the event via email. The attachment to the email includes video images that have likely captured the intruder as he entered through the door in an unauthorized manner. The real-time generation of emailed messages may enable the client to immediately take appropriate action. Significantly, as the video images of the intruder have already been transmitted to off-site storage site 330, there is no possibility that the intruder can gain access to and remove the only physical copy of the recorded video images.

Figure 8:
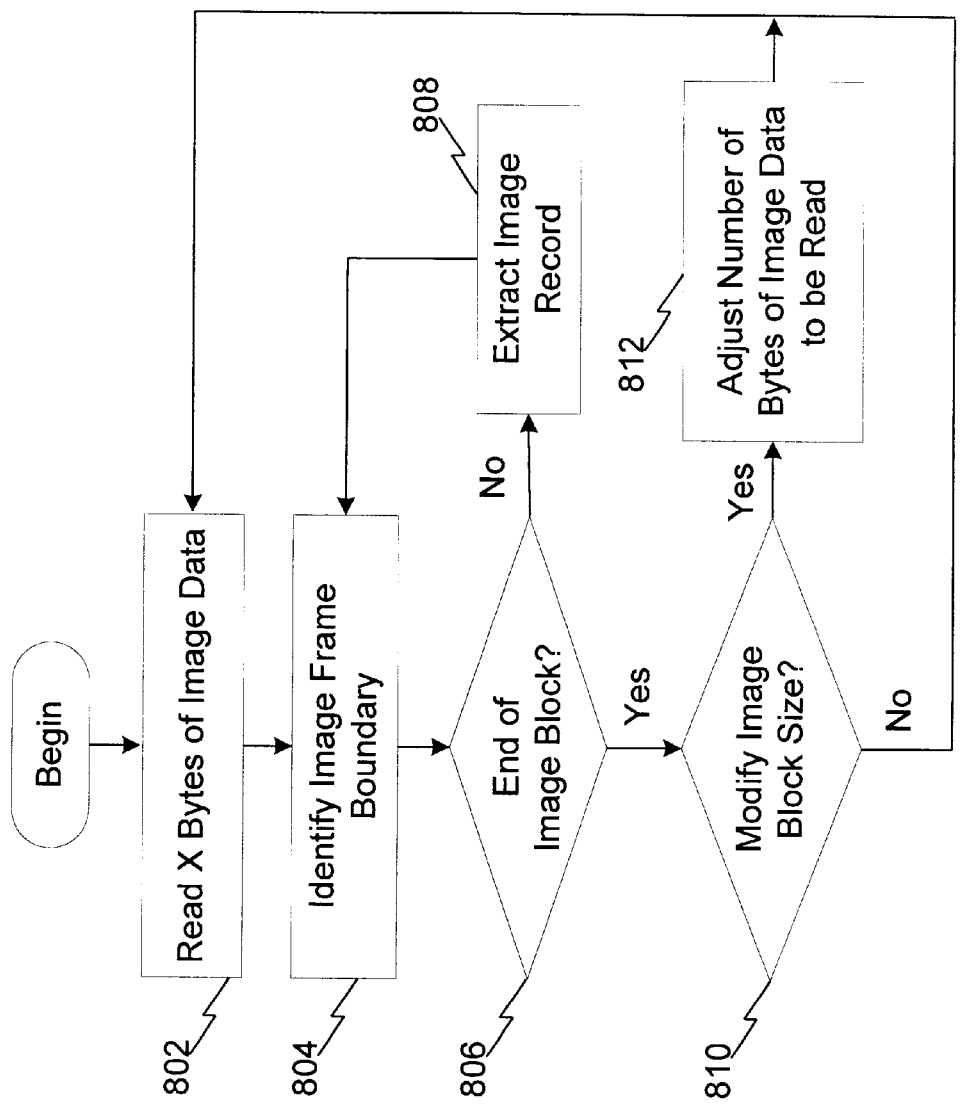
FIG. 8 is a flowchart of the processing steps of the transmission and storage of video image data at an off-site storage facility.

As noted, a significant feature of the present invention is the real-time dynamic off-site storage of video images. The process of receiving and storing video image data is illustrated in the flowchart of FIG. 8.

The process begins at step 802 where ImageCapture application 510 reads X bytes of video image data from a memory buffer. The video image data stored in the memory buffer is received by off-site server 332 in response to a HTTP request by ImageCapture application 510. The read block of video image data includes one or more video images. As one can readily appreciate, the size of each image frame in the block of video image data can vary widely depending upon the characteristics of the scene being captured. Scenes having a relatively high number of widely contrasting colors and light intensities will not be amenable to significant video image data compression relative to a scene having a generally monotonic characteristic. For this reason, a single block size of video image data that is read from the memory buffer can have a highly variable number of image frames contained therein.

In the present invention, ImageCapture application 510 dynamically controls the size of the block of video image data that is read from the memory buffer. This control is effected through action by ImageCapture application 510 to effectively limit the number of frames included within the read block of video image data. For example, in one embodiment, ImageCapture application 510 modifies the read block size of image data such that only N (e.g., two)

frames are to be expected given a calculated average image frame size. This control mechanism is illustrated by the loop created by steps 802–812 in FIG. 8.

After a block of image data is read at step 802, Image-Capture application 510 proceeds to extract individual image frames from the read block of image data. More specifically, at step 804, ImageCapture application 510 searches for an image frame boundary that identifies the ending point of a first image frame. At step 806, ImageCapture application 510 determines whether the end of the read image block has been reached. If the end of the read image block has not been reached, then the image frame can be extracted at step 808. After an image frame has been extracted, ImageCapture application 510 then loops back to step 804 to identify the next image frame boundary in the read image block.

If at step 806, ImageCapture application 510 determines that the end of the read image block has been reached, then ImageCapture application 510 determines, at step 810, whether a modification in the read block size is needed. For example, assume that a 40 k image block has been read, where the 40 k image block contains five video images of approximately 8 k size. Assume further that it is desired by ImageCapture application 510 to have a block that includes only two image frames. In this scenario, off-site server 332 would adjust, at step 812, the amount of bytes of image data to be read from the memory buffer to about 16 k. A similar adjustment can also be made where the previously read block of image data only includes one image frame. If ImageCapture application 510 determines, at step 810, that a modification in read block size is not required, then ImageCapture application 510 reads the same amount of image data from the memory buffer.

Figure 11:
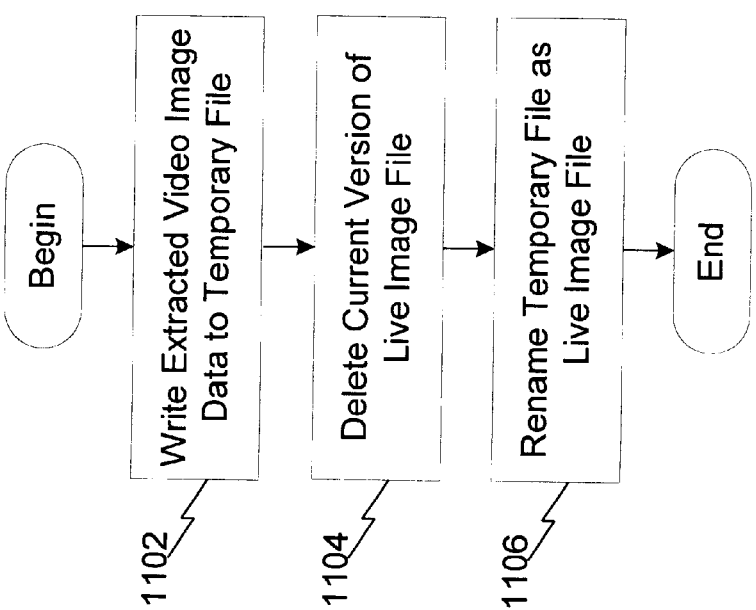
FIG. 11 is a flowchart of the processing steps in producing live video images.

After an image frame has been extracted at step 808, it is ready to be processed for live production and/or for archive storage in image database 334. As noted, the recording type parameter in the configuration file informs ImageCapture application 510 whether captured video image data should only be published for live viewing, whether captured video image data should only be archived in image database 334, or whether captured video should be published for live viewing and be archived in image database 334. The processing of video images in both the live production and archive storage scenarios are now discussed with reference to the flowcharts of FIG. 11 and FIG. 12, respectively.

In the live production scenario, ImageCapture application 510 stores each extracted video image into a file on off-site server 332 that is accessible by a user at client workstation 322. In one embodiment of the present invention, at step 1102, ImageCapture application 510 first writes the extracted video image data into a temporary file. Upon completion of the writing of the extracted video image data to the temporary file, the temporary file can then be renamed to a file (e.g., live_1.jpg) that can be accessed by client workstation 322. Prior to the renaming of the temporary file, the current version of the "live" file is first deleted at step 1104. After the current version of the "live" file is deleted, the temporary file is then renamed, at step 1106, as the new version of the "live" file. In this manner, video images that are continually extracted from the block of image data are each initially written to the same temporary file then subsequently renamed to the same "live" file (e.g., live_1.jpg).

To facilitate user access, the "live" file is preferably located in a directory that is associated with the camera 312 that has captured the now extracted video image. In one embodiment, the directory structure in the file system is hierarchically based in accordance with parameters Exxxx, Lxxxx, and Cxxxx, where Exxxx represents the client number, Lxxxx represents the location number, and Cxxxx represents the camera number.

To enable the retrieval of the "live" file, View application 610 is configured with the Exxxx, Lxxxx, and Cxxxx parameters. View application 610 can then forward a request to off-site server 332 for a transfer of the file "live_1.jpg" located in a specified place within the hierarchical directory structure.

It should be noted that the writing of data by ImageCapture application 510 into the temporary file and the subsequent renaming to the "live" file may not occur at the same rate as the transfer of the "live" file to client workstation 322. For example, assume that ImageCapture application 510 effectively writes video image data into the "live" file at a rate of three image files per second. Client workstation 322, on the other hand, may not be capable of reading the "live" file at that rate. For example, due to the limited speed of the Internet connection to off-site server 332, client workstation 322 may only be able to retrieve every third "live" file that has been written by ImageCapture application 510. In essence, client workstation is reading the "live" files at a rate of one frame per second. Notwithstanding this variance in the rate of reading of client workstation 322 as compared to the rate of writing of ImageCapture application 510, client workstation 322 is still able to provide the user with a live view of the scenes being captured by camera 312.

FIG. 10A illustrates an example of a user interface 1010 that facilitates live viewing of captured video images. In one embodiment, user interface 1010 comprises an image viewing window 1012, start button 1014, and stop button 1016. Upon the initiation of View application 610, client workstation 322 sends requests to off-site server 332 to retrieve the "live" file stored at the directory of the file system designated for the camera 312 of interest. Stop button 1016 enables the user to terminate the "live" file retrieval process, while play button 1014 enables the user to reinitiate the "live" file retrieval process. Further features of the general live viewing and control interface 1000 are discussed in detail below.

Having described the production of live video images, the archive process is now described. As noted, the production of live video images can occur simultaneously with the archive storage of the same video images.

Figure 12:
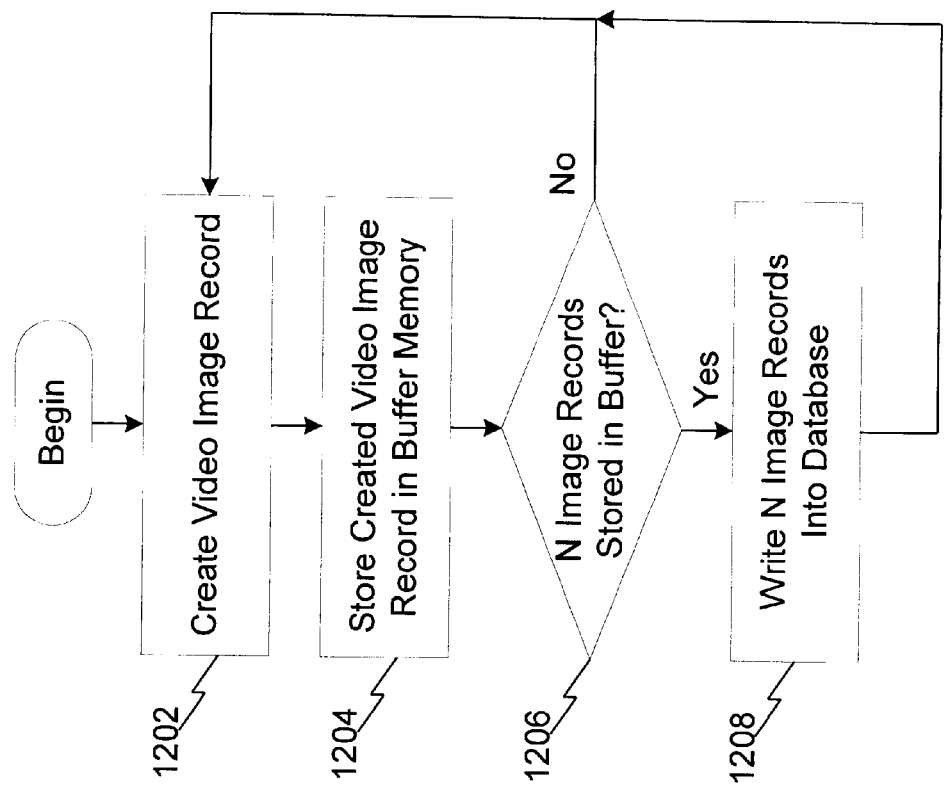
FIG. 12 is a flowchart of the processing steps of storing video image records into an image database.

The archive storage process is illustrated by the flow chart of FIG. 12. The process begins at substantially the same point as the process of producing live images. In particular, the flowchart of FIG. 12 begins, at step 1202, after a video image has been extracted from the block of video image data that has been read from the memory buffer. In step 1202, ImageCapture application 510 creates a video image record.

The video image record includes the extracted video image data. Other pieces of information can also be stored as part of the video image record depending upon the goals and features of a particular implementation. In one embodiment, the video image record also includes additional fields of information such as a file name field, a sequence number field, a date-time stamp field, a time zone offset field, and a capture type field.

The sequence number field holds a value that enables ImageCapture application 510 to define a sequential relation among video image records. As such, the sequence number field can serve as an index generated by an incremental counter. The index enables off-site server 332 to identify and retrieve archived video image records from a time period requested by a user.

The date-time stamp field holds a date-time value. In one embodiment, the date-time stamp value is in a yyyy:mm:dd:hh:mm:ss format that enables the storage of year, month, date, hour, minute, and second information. In addition to date-time stamp field, the video image record can also include a time-zone offset field. The time-zone offset field enables off-site server 332 to recognize time-zone differences of the various client sites 310. It should be noted that the date-time stamp field can also be used by off-site server 332 as an index that enables off-site server 332 to retrieve archived video image records from a time period requested by a user.

Finally, the capture type field includes a value (e.g., 1–8) that identifies a type of event that led to the capture of the video image. The value is correlated to an event type based upon a defined list of event types that is stored in a database for that client and camera 312. The capture type field enables off-site server 332 to provide a summary list of triggering events that have led to the initiation of recording at one or more cameras 312 at client sites 310.

After the video image record has been created, ImageCapture application 510, at step 1204, stores the video image record in a buffer memory. Next, at step 1206, ImageCapture application 510 determines whether N (e.g., 24) video image records have been stored in the buffer memory. If ImageCapture application 510 determines that N records have not yet been accumulated in the buffer memory, then the process loops back to step 1202 where the next video image record is created. If ImageCapture application 510 determines that N records have been accumulated in the buffer memory, then ImageCapture application 510, at step 1208, writes the N accumulated video image records into image database 334 at a directory location defined by the Exxxx, Lxxxx, and Cxxxx parameters. The writing of a block of N video image records into image database 334 relieves the storage devices from having to continually write data into the image database 334. Overall system performance and longevity of the storage devices is thereby improved.

The creation of an image database 334 in off-site storage site 330 enables a significant improvement in access to video images captured through an entity's surveillance and monitoring efforts. As the connection between client workstation 322 and off-site server 332 is facilitated by public Internet 350, access to video image data in image database 334 is vastly more convenient. In the Internet environment, a single session facilitated by a web-browser interface enables a user at client workstation 322 to access video images captured by cameras 312 at multiple client sites 310. Also significant is the ability of multiple users to simultaneously view video images from a single camera 312 at a particular client site 310.

An embodiment of a user interface 900 that enables access to archived video images stored in image database 334 is now described with reference to FIGS. 9A–9C. User interface 900 is implemented as part of a standard web-browser interface generated by off-site server 332 and rendered by client workstation 322.

The general process of retrieving archived video images can comprise two general steps, the selection of a particular camera 312 and the selection of a period of time of interest. As illustrated in FIG. 9A, user interface 900 includes frame 910 and frame 920. Frame 910 enables a user at client workstation 322 to select a particular camera 312. In this process, the user can navigate through varying levels in a hyperlinked hierarchy that describes a particular client's network of cameras. In FIG. 9A, Client X's hierarchy is, for example, divided into three separate regions, wherein Region 3 is further divided into four separate stores. Store 4 is further divided into three camera locations that are assigned to separate views within store 4. Assume that the user has selected the hyperlinked element, Camera Loc 1.

After Camera Loc 1 has been selected by the user, a period of time can now be selected. The process of selecting the period of time can begin in the user interface represented by frame 920. Frame 920 includes a calendar-type interface that displays the months of the year along with the individual days (not shown) within each month. Each day in the calendar displayed within frame 920 can represent hyperlinked text that enables the user to further select a particular time period within the selected day. More specifically, using the interface of frame 920, the user can point and click on a particular day of a particular month and be subsequently presented with frame 930 such as that illustrated in FIG. 9B.

Frame 930 is an embodiment of a user interface that enables the user to select a particular time period within the previously selected day. Frame 930 includes user interface elements 931, 933, and 935, which display the user's selected choice of hour, minute, and AM/PM, respectively. The selection of hour, minute and AM/PM by the user is facilitated by buttons 932, 934, and 936, respectively, which produce a scrollable list of available choices. After the time period has been selected, the user can point and click on button 937. The activation of button 937 produces user interface frame 940 of FIG. 9C.

Frame 940 is an embodiment of a user interface that enables the user to control the viewing of archived video images that have been retrieved from image database 334. Frame 940 includes image viewing window 949 along with VCR-type controls 941–948. Prior to viewing archived images in image viewing window 949, client workstation 322 first caches a block of video images (e.g., 150 video images) from the selected time period. Once the video images have been cached, the user can then control the playback of the video images using VCR-type controls 941–948. VCR-type controls include play button 941, fast play button 942, single frame advance button 943, stop button 944, reverse play button 945, fast reverse play button 946, single frame reverse button 947, and images per second selection 948. As illustrated, images per second selection 948 enables the user to select a frame rate (e.g., 30, 20, 10, 5, or 1 frames per second) that will control the rate of video image playback. The user initiates the playback by selecting play button 941. Playback of video images will then appear in image viewing window 949. If no images per second selection has been chosen, a default value is used (e.g., 5 frames per second). The user can then modify the images per second rate on the fly during playback. Viewing/searching through video images is also controlled by VCR-type controls 941–948.

After the user has finished viewing the content of the video images generated by Camera Loc 1, the user may wish to view the video images generated by Camera Loc 2 or Camera Loc 3. This situation could occur if the other camera locations would likely provide additional footage of a single event of interest (e.g., burglary). This viewing process is enabled by simply changing the selection of the camera 312 from the choices (i.e., Camera Loc 1, 2, or 3) presented in frame 910 of FIG. 9A. More generally, the user can switch to any camera location that is present within the client's network. This viewing process is enabled by the navigation through higher levels of the camera hierarchy in frame 910 of FIG. 9A.

As described, the retrieval of archived video images can be based upon a selection of a desired time period. More generally, the archived video images can be retrieved upon the basis of any attribute that is stored as part of a video image record. For example, archived video images can be retrieved on the basis of an event specified in the capture type field. In this manner, a user can identify and retrieve all segments of video that have been recorded upon the detection of a particular event (e.g., machine operating condition).

In general, the retrieval of archived video images is substantially instantaneous, and bears no relation to the original location of the camera 312, which captured the video images. Control and access of archived video images is thereby significantly improved relative to the direct dial-up access of archived video images at individual client sites 210.

In addition to the storage of archived images, off-site storage site 330 also enables the production of live images from each camera 312 that is coupled to the network. The process of producing live images was described above with reference to the flowchart of FIG. 11. An embodiment of a user interface 1000 that facilitates live viewing is now described.

The general process of retrieving live video images is started upon the selection of a particular camera 312. Selection of a particular camera 312 can be facilitated by the same type of user interface represented by frame 910 in FIG. 9A. After a camera 312 has been selected, a user interface 1010 within general live image user interface 1000 is presented. User interface 1010 is rendered by View application 610 running on client workstation 322.

User interface 1010 includes live image viewing window 1012, start button 1014, and stop button 1016. Upon the initiation of View application 610, client workstation 322 proceeds to send requests to off-site server 332 for the "live" image file (e.g., live_1.jpg) stored in the directory assigned to the selected camera 312. As noted, the retrieval of the "live" image file may not occur at the same rate as the rate at which the "live" image file is being updated. In this case, live image viewing window 1012 would simply show a sample of the live video images that are being captured by the selected camera 312. If the images being captured from selected camera 312 are also being archived, then the complete set of video images would be stored in image database 334.

The basic user interface 1010 simply enables the viewing of live images. In another embodiment, a live viewing user interface 1000 can also include the real-time control of the selected camera 312. Two examples of the real-time camera control interface are illustrated as user interface 1020 and user interface 1030 in FIG. 10B and FIG. 10C, respectively. User interfaces 1020 and 1030 are rendered by ViewControl application 620 running on client workstation 322. In performing the real-time camera control functionality, ViewControl application 620 communicates with CameraControl application 520 on off-site server 332.

User interface 1020 illustrates a scenario where camera server 314 is able to return current PTZ positions of camera 312. The receipt of this state information (i.e., PTZ) enables client workstation 322 to provide camera controls relative to an absolute position. These camera controls are illustrated in user interface 1020 as pan scrollbar 1022, tilt scrollbar 1024, and zoom scrollbar 1026. The effect of the manipulation of any one of pan scrollbar 1022, tilt scrollbar 1024, and zoom scrollbar 1026 will be seen instantaneously in the live image that is displayed in viewing image window 1012. User interface 1020 also includes a scrollable list 1028 that enables a user at client workstation 322 to select from among a variety of preset camera positions.

User interface 1030, on the other hand, illustrates a scenario where camera server 314 is not able to return current PTZ positions of camera 312. As client workstation 322 does not have knowledge of the current PTZ state of camera 312, client workstation 322 can only provide camera controls on a relative basis. These relative camera controls are illustrated in user interface 1030 as Pan&Tilt controls (UpLeft, Up, UpRight, Left, Right, DownLeft, Down, and DownRight) 1032 and Zoom controls (In, Out, Fast In, and Fast Out) 1034. The effect of the manipulation of any one of Pan&Tilt controls 1032 and Zoom controls 1034 will be seen instantaneously in the live image that is displayed in viewing image window 1012.

User interface 1030 also includes a scrollable list 1028 that enables a user at client workstation 322 to select from among a variety of preset camera positions. Although user interface 1030 represents a scenario where camera server 314 is not able to return current PTZ positions of camera 312, camera 312 may enable storage of presets on the camera itself. These presets can be accessible through an application programming interface (API).

In a preferred embodiment, ViewControl application 620 is a multithreaded applet, wherein both live image loading and camera control have their own distinct thread. As described above, live image loading is accomplished through the request and subsequent transfer of the live video image file (e.g., live_1.jpg) associated with the selected camera 312. This live image file can be stored in a directory that is associated with the selected camera 312.

Figure 13:
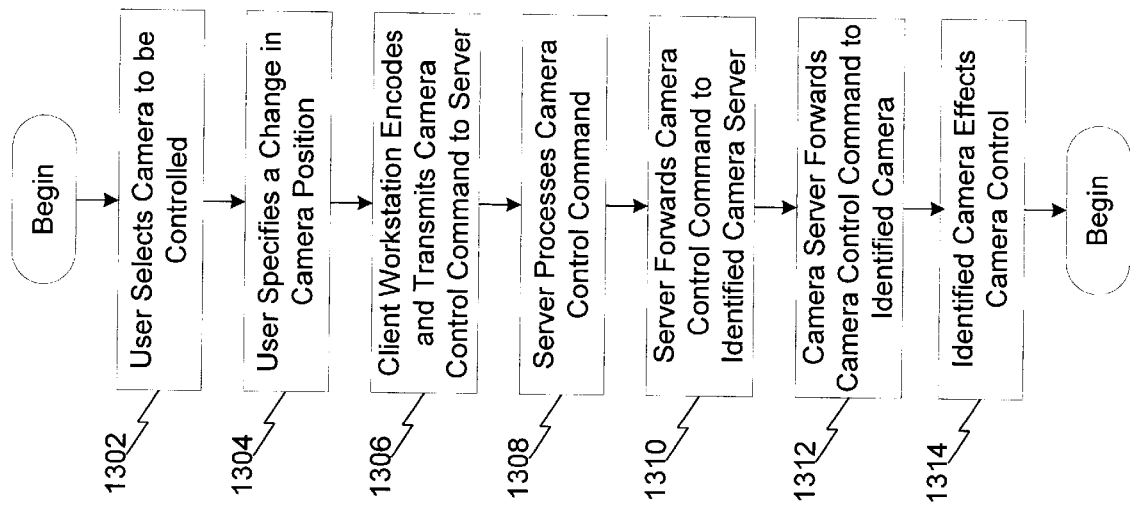
FIG. 13 is a flowchart of the processing steps of controlling a surveillance camera from a location remote from a client site.

While live image loading represents a transaction between client workstation 322 and off-site server 332, camera control represents a transaction between client workstation 322, off-site server 332, camera server 314, and camera 312. This transaction is illustrated in the flowchart of FIG. 13.

The camera control process begins at step 1302 with a user selecting a camera 312 to be controlled. This selection process has been described above in the context of both live video image loading and archived video image retrieval. In the illustrated embodiment, the selection of a camera 312 is facilitated by a hierarchical menu of a client's network of surveillance cameras 312. After a camera 312 has been selected by the user, the live image loading thread of ViewControl application 620 can begin to request and display live video images that are stored in a "live" file by off-site server 332.

The live viewing user interface 1000 presented to the user will depend upon the camera 312 that has been selected by the user. As noted, the live viewing user interface is dependent on whether off-site server 332 is able to retrieve state information from camera 312. If state information is available, then user interface 1020 containing absolute PTZ controls 1022, 1024, 1026 is presented. If state information is not available, then user interface 1030 containing relative PTZ controls 1032, 1034 is presented.

Assume that the user is presented with user interface 1020, which contains absolute PTZ controls 1022, 1024, 1026. After activation of start button 1014, the user is now presented with a display of live video images in image viewing window 1012. The user can now choose to interactively change the live view in image viewing window 1012 using absolute controls 1022, 1024, 1026. For example, the user can decide to zoom in on a particular object or person that is displayed in image viewing window 1012 or pan in a direction of a particular object or person that is on the edge of image viewing window 1012. The specification by the user of a particular change in a camera's PTZ position is represented as step 1304.

Having received the user's specification of a change in a camera's PTZ position, the camera control thread in ViewControl application 620 then submits, at step 1306, a camera control command to CameraControl application 520 to effect the user's specified camera position change. In one embodiment, the camera control command submitted by client workstation 322 includes the following information: an IP address of the camera server, a camera number, a camera control command code, and a camera/camera server type.

In a preferred embodiment, the IP address of the camera server 314 is transmitted as a sequence of five octets. Four of the five octets represent an encoded IP address, while the fifth octet is used as a conversion parameter. The encoding of the IP address of the camera server 312 by client workstation 322 serves to obscure the IP address as the command is transmitted over public network 350. Although not required, this encoding serves to keep confidential, the IP addresses of camera servers 314 that are coupled to private network 340. As one of ordinary skill in the relevant art would appreciate, various methods of encoding IP addresses could be used and the present invention is not limited by a particular encoding method.

The camera number information (e.g., value between 1–4) serves to identify the particular camera 312 that is coupled to the camera server 314 identified by the encoded IP address. This identification enables the camera control command to be routed by the identified camera server 314 to the proper camera 312.

The camera control command code is used to specify the particular camera control selected by the user. In the context of the user interface 1020 having absolute PTZ controls 1022, 1024, 1026, the camera control command code can designate one of PanAbsolute, TiltAbsolute, and ZoomAbsolute commands. In the context of user interface 1030 containing relative PTZ controls 1032, 1034, the camera control command code can designate one of UpLeft, Up, UpRight, Right, DownRight, Down, DownLeft, ZoomIn, ZoomOut, ZoomInFast, and ZoomOutFast commands. As would be appreciated by one of ordinary skill in the relevant art, parameters for each of these camera commands can also be transmitted with the camera control command code.

The camera/camera server type information specifies the type of environment existing at client site 310. Depending upon the combination of camera 312 and camera server 314, state information may not be retrievable. For example, the combination of an AXIS 240 camera server with a Sony/Cannon camera enables the retrieval of state information, while the combination of an AXIS 240 camera with a Pelco camera does not enable the retrieval of state information. The transmission of the camera/camera server type by client workstation 322 thereby enables CameraControl application 520 to perform an additional check to ensure that the received camera control command code (e.g., absolute PTZ control code) is proper for the particular camera/camera server combination.

After the camera control command is generated by client workstation 322, the camera control command is transmitted to CameraControl application 520. At step 1308, CameraControl application 520 processes the received camera control command. In this processing step, CameraControl application 520 decodes the encoded IP address and parses the camera control command code to determine the action that is desired by the user. The parsed camera control command is then converted into a binary-coded camera control command string that is recognizable by the particular camera 312.

In general, CameraControl application 520 functions as a proxy application, providing the user with a single standardized graphical user interface, while customized libraries communicate the individual protocols required by each manufacturer's camera. The interposing CameraControl application 520 provides an abstraction layer, making the customized PTZ operation appear transparent to the user. More generally, CameraControl application 520 can be used to provide single standardized graphical user interfaces to control other devices in client site 310, including such devices as a multiplexor, an audio/video switch, time lapse VCRs, etc.

After the camera control command has been processed by CameraControl application 520 on off-site server 332, the processed camera control command is transmitted, at step 1310, to the camera server 314 identified by the decoded IP address. Next, at step 1312, the camera server 314 forwards the binary-coded camera control command string to the camera 312 identified by the camera number provided in the camera control command. Finally, at step 1314, camera 312 effects the intended camera control based upon the received binary-coded camera control command string.

In a typical state of operation, camera server 314 is responding to a continual stream of requests by ImageCapture application 510 for images that are being captured by a plurality of cameras 312A–312D coupled to camera server 314. The processing of this continual stream of image forwarding requests can introduce latency effects in the processing of camera control commands. These latency effects can result in significant loss of camera control. Accordingly, in an alternative embodiment, camera control commands are not forwarded to camera servers 314. Rather, camera control commands are forwarded to a separately addressable device (not shown) at client site 310 that is associated with a camera server 314. The separately addressable device is solely responsible for receiving camera control commands from off-site server 332 and for forwarding camera control commands to individual cameras 312. As the separately addressable device is not being inundated with image forwarding requests from off-site server 332, delays in processing camera control commands is thereby minimized.

As thus described, the present invention provides a framework for real-time off-site video image storage that enables increased functionality in the retrieval of video images. As compared to conventional surveillance and monitoring systems 100, 200 that are focused on activities at single client sites, the present invention seeks to extend the surveillance and monitoring activities to a global scale.

Off-site storage site 330 is capable of receiving video images from thousands of video feeds. Millions of hours of video recording representing hundreds of terabytes of information can be stored in off-site storage site 330. Due to its design as a scalable enterprise, however, these figures are merely illustrative of the potential scale of the present invention.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A video surveillance and monitoring system, comprising:

a private network that enables communication with surveillance cameras corresponding to geographic sites;

wherein at least two surveillance cameras correspond to geographically distinct sites; and a centralized off-site control site, including at least one server, said at least one server being coupled to said private network and to a public network, said at least one server being operative to initialize communications between the surveillance cameras and at least one off-site client workstation coupled to said public network, to coordinate the retrieval of video images from all said surveillance cameras, to produce said retrieved video images as live images to the at least one off-site client workstation, and to enable off-site client workstations to effect real-control over selected surveillance cameras, wherein the off-site client workstation cannot initialize communication with the surveillance cameras.

2. The system of claim 1, wherein said private network is a virtual private network configured over a public network.

3. The system of claim 1, wherein said private network is coupled to a camera server, and said camera server is coupled to one or more surveillance cameras.

4. The system of claim 3, wherein said one or more surveillance cameras produce composite NTSC video signals, and wherein the camera server is operable to capture the NTSC video signals and convert the captured NTSC video signals.

5. The system of claim 1, wherein one of said surveillance cameras comprises a self-contained web server and network camera.

6. The system of claim 1, wherein said public network is a public Internet network.

7. The system of claim 1, wherein said at least one server is operative to repeatedly store live video image data to a file that is retrievable by a client workstation.

8. The system of claim 7, wherein said at least one server is operative to write live video image data to a temporary file, and to rename said temporary file to said file that is retrievable by a client workstation.

9. The system of claim 1, wherein said at least one server is operative to receive and process a camera command control code that identifies a user's desired type of camera adjustment.

10. The system of claim 9, wherein said camera control code identifies an absolute pan-tilt-zoom control.

11. The system of claim 9, wherein said camera control code identifies a relative pan-tilt-zoom control.

12. The system of claim 9, wherein said at least one server is operative to receive and process an encoded Internet Protocol address of a camera server.

13. The system of claim 9, wherein said at least one server is operative to convert a received camera control code to a binary-coded command string and to forward said binary-coded command string to an identified surveillance camera.

14. The system of claim 13, wherein said binary-coded command string is forwarded to a camera server, which in turn forwards said binary-coded command string to a surveillance camera.

15. The system of claim 13, wherein said binary-coded command string is forwarded to a self-contained web server and network camera.

16. The system of claim 13, wherein said binary-coded command string is forwarded to a separately addressable device that is solely responsible for receiving cameral control commands.

17. In an environment including at least one centralized control site coupled to a private network that enables communication with surveillance cameras at a plurality of geographically distinct client sites and to a public network that enables communication with a client workstation remote from the surveillance camera, a video surveillance and monitoring method, comprising:

(a) receiving a communication from a client workstation coupled to the public network, said communication including a first camera control command code representative of a surveillance camera control instruction;

(b) converting said received first camera control command to a first binary-coded command string;

(c) sending said first binary-coded command string to an identified address on said private network, said identified address being associated with a first identified surveillance camera;

(d) receiving a communication from a client workstation coupled to the public network, said communication including a second camera control command code representative of a user's desired type of camera control;

(e) converting said received second camera control command to a second binary-coded command string;

(f) sending said second binary-coded command string to an identified address on said private network, said identified address being associated with a first identified surveillance camera;

wherein the first and second identified surveillance cameras are geographically distinct; and wherein the client workstation cannot directly access the first and second surveillance cameras without an initialization by the centralized off-site control site.

18. The method of claim 17, wherein step (a) comprises the step of receiving a camera control code that identifies an absolute pan-tilt-zoom control.

19. The method of claim 17, wherein step (a) comprises the step of receiving a camera control code that identifies a relative pan-tilt-zoom control.

20. The method of claim 17, wherein step (a) comprises the step of receiving as part of said communication an address on said private network to which said binary-coded command string should be sent.

21. The method of claim 20, wherein step (a) comprises the step of receiving as part of said communication an Internet Protocol address.

22. The method of claim 21, wherein step (a) comprises the step of receiving as part of said communication an encoded Internet Protocol address.

23. The method of claim 21, wherein step (a) comprises the step of receiving as part of said communication a surveillance camera number.

24. The method of claim 17, wherein step (c) comprises the step of sending said binary-coded command string to a camera server.

25. The method of claim 17, wherein step (c) comprises the step of sending said binary-coded command string to a self-contained web server and network camera.

26. The method of claim 17, wherein step (c) comprises the step of sending said binary-coded command string to a separately addressable device that is solely responsible for receiving cameral control commands.

27. The system of claim 1, wherein the server is further operative to generate a camera control code instructing one or more of the surveillance cameras to move to a pre-defined position.

28. The system of claim 26, wherein the server is further operative to generate the camera control code after a designated period of time.

29. The system of claim 27, wherein the server is further operative to generate a series of camera control codes instructing one or more of the surveillance cameras to move to a series of pre-defined positions.

30. The system of claim 1, wherein the server is further operative to generate an interface for displaying real-time video image data from a plurality of client sites.

31. The system as recited in claim 30, wherein the interface is a Web-based interface.

32. The system of claim 31, wherein the Web-based interface includes a calendar interface, wherein the calendar interface includes a number of hyperlinks, the hyperlinks corresponding to defined periods of time and operable to generate additional screen interfaces corresponding to a time selection.

33. The system of claim 32, wherein the hyperlinks correspond to months and a year, and wherein the hyperlinks are operative to generate additional screen interfaces presenting a user with a selection of a particular time to control surveillance camera.

34. The system of claim 1, wherein the server is further operable to extract real-time video data from at least one surveillance camera utilizing a dynamic data block management schema.

35. The method of claim 17, wherein the binary-coded command string instructs one or more surveillance cameras to move to a pre-defined location.

36. The method of claim 35, wherein the binary-coded command string instructs a surveillance camera to move to a series of pre-defined locations.

37. The method of claim 35, wherein the sending of said binary-coded command string is accomplished after a designated time period has expired.

38. The method of claim 17, wherein the user interface is a Web-based user interface.

39. The method of claim 38, wherein the Web-based interface includes a calendar interface, wherein the calendar interface includes a number of hyperlinks, the at hyperlinks corresponding to defined periods of time and operable to generate additional screen interfaces corresponding to a time selection.

40. The method of claim 39, wherein the hyperlinks correspond to months and a year, and wherein the hyperlinks are operative to generate additional screen interfaces presenting a user with a selection of a particular time to control the surveillance cameras.

41. The system of claim 1, wherein the at least one off-site client workstation cannot directly access the surveillance cameras to retrieve video images or control selected surveillance cameras without an initialization by the centralized off-site control site.

42. The system of claim 41, wherein the centralized off-site control site coordinates all communications between the at least one off-site client workstation and the surveillance cameras.

43. A video surveillance and monitoring system, the system comprising:
  a plurality of video monitoring devices, each monitoring device generating video monitoring data corresponding to a geographic area, wherein the plurality of video monitoring devices generate live video data and receive control instructions corresponding to a position of the video monitoring device and wherein at least two video monitoring devices of the plurality of video monitoring devices correspond to geographically distinct sites;
  a centralized control site in communication with the plurality of video monitoring devices via a private communication, wherein the centralized control site retrieves live video data from the plurality of video monitoring devices; and
  at least one client workstation remote from the plurality of video monitoring devices and in communication with the centralized control site via public communication network, wherein the client workstation requests monitoring device data from at least one geographic area and wherein the client workstation initiates video monitoring control instructions;
  wherein the centralized control site associates at least one of the plurality of video monitoring devices to the client workstation requests and initializes communications between the at least one client workstation and the associated video monitoring device, wherein the client workstation cannot directly access the associated video monitoring device without an initialization by the centralized control site.

44. The system as recited in claim 43, wherein the private network is a virtual private network configured over a public network.

45. The system as recited in claim 43 further comprising a camera server corresponding to a geographic area and coupled to at least one video monitoring device corresponding to the geographic area, wherein the camera server is further coupled to the private network to facilitate communications with the, centralized control site.

46. The system as recited in claim 45, wherein the plurality of video monitoring devices produce composite NTSC video signals, and wherein the camera servers are operable to capture the NTSC video signals and convert the captured NTSC video signals.

47. The system as recited in claim 43, wherein the plurality of video monitoring devices include at least one self-contained Web server and network camera.

48. The system as recited in claim 43, wherein the centralized control site writes live video image data from the plurality of the video monitoring devices to a temporary file, wherein the temporary file is retrievable by a client workstation.

49. The system as recited in claim 43, wherein the at least one client workstation video monitoring control instructions included an identification of an absolute pan-tilt-zoom control.

50. The system as recited in claim 43, wherein the client workstation video monitoring control instructions include identification of a relative pan-tilt-zoom control.

51. The system as recited in claim 43, wherein the centralized control site converts a client workstation video monitoring control instruction into a binary-coded command string and forwards the binary-coded command string to a selected video monitoring device.

52. The system as recited in claim 43, wherein the centralized control site generates camera control codes instructing one or more of the plurality of video monitoring devices to move to predefined positions.

53. The system as recited in claim 52, wherein the centralized control site generates a series of camera control instructions instructing at least one of the plurality of video monitoring devices to move to a series of predefined positions.

* * * * *

UNITED STATES PATENT AND TRADEMARK OFFICE
CERTIFICATE OF CORRECTION

PATENT NO. : 6,698,021 B1  Page 1 of 1
DATED : February 24, 2004
INVENTOR(S) : S.S. Amini et al.

It is certified that error appears in the above-identified patent and that said Letters Patent is hereby corrected as shown below:

Title page,
Item [56], References Cited, U.S. PATENT DOCUMENTS, "6,271,805" reference, "Yozenawa" should read -- Yonezawa --; and insert:
-- OTHER PUBLICATIONS
Eyecast.com Introduces SchoolCase services for School Safety Officials and Law Enforcement Agencies, Press Release dated Apr. 28, 1999.
EyeCast.com Adds 360-Degree Continuous Pan Rotation Cameras to It's Eye View Service, Press Release dated Mar. 15, 1999.
Screen Printing from www.remotecams.com, "Take a Step Into the Future...," printed Sep. 17, 1999.
EyeCast.com, "EyeCast secures deals...", Washington Business Journal, Aug. 13-19, 1999, Tech Section, p. 16.
EyeCast.com Announces EyeView Control, Press Release dated Oct. 12, 1998.
EyeCast.com Announces EyeCapture Sevices, Press Release dated Jul. 8, 1998.
EyeCast.com, Inc., "Providing Live Interactive Video for Surveillance & Monitoring Over the Internet."
Axis Communications, publication entitled "Axis 200+ Web Camera.
Axis Communications, publication entitles "Axis 240 Camera Server."
Axis Communications, www.axis.se/products/cam_240/, "30 Frames/Second/"
Axis Communications, www.axis.se/products/camera_servers/cam_app_sol.htm, "Network Cameras Applications and Solutions."
Axis Communications, www.axis.se/products/camera_servers/ca_fb.html, "Features & Benefits." --

Signed and Sealed this

Fourth Day of January, 2005

JON W. DUDAS
*Director of the United States Patent and Trademark Office*